US012777323B2

(12) United States Patent
Liu

(10) Patent No.: US 12,777,323 B2
(45) Date of Patent: Oct. 27, 2026

(54) MANAGING COMPATIBILITY OF TRANSCEIVERS USED IN INTER-CONNECTED SYSTEMS

(71) Applicant: Dell Products L.P., Round Rock, TX (US)

(72) Inventor: Yayun Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 249 days.

(21) Appl. No.: 18/916,590

(22) Filed: Oct. 15, 2024

(65) Prior Publication Data

US 2026/0107129 A1 Apr. 16, 2026

(51) Int. Cl.

| | |
|---|---|
| ***H04W 8/22*** | (2009.01) |
| ***H04W 12/50*** | (2021.01) |
| *H04B 1/40* | (2015.01) |

(52) U.S. Cl.

CPC ............ *H04W 8/22* (2013.01); *H04W 12/50* (2021.01); *H04B 1/40* (2013.01)

(58) Field of Classification Search

None

See application file for complete search history.

(56) References Cited

U.S. PATENT DOCUMENTS

2015/0120969 A1* 4/2015 He ........................ G06F 3/0611 710/74

2020/0226326 A1* 7/2020 Ros ........................ G06F 40/58

* cited by examiner

*Primary Examiner* — Frantz Bataille

(74) *Attorney, Agent, or Firm* — Chamberlain, Hrdlicka, White, Williams & Aughtry; Aly Z. Dossa

(57) ABSTRACT

A method for managing compatibility of transceivers includes: sending a request to a NIC to obtain a unique identifier (UI) of the NIC; receiving a response from the NIC including the UI; sending a request to the NIC to obtain a second UI of a transceiver that is being executed on the NIC; receiving a response from the NIC including the second UI; mapping the UI to the second first UI to generate a mapping; using the mapping and a capability list to identify a compatibility status of the transceiver; establishing a connection with a switch using a set of credentials; sending a request to a BMC of the switch; receiving a response from the BMC including a third UI of a second transceiver that is being executed on the switch and a compatibility status of the second transceiver; and initiating displaying of the compatibility statuses to a user.

20 Claims, 9 Drawing Sheets

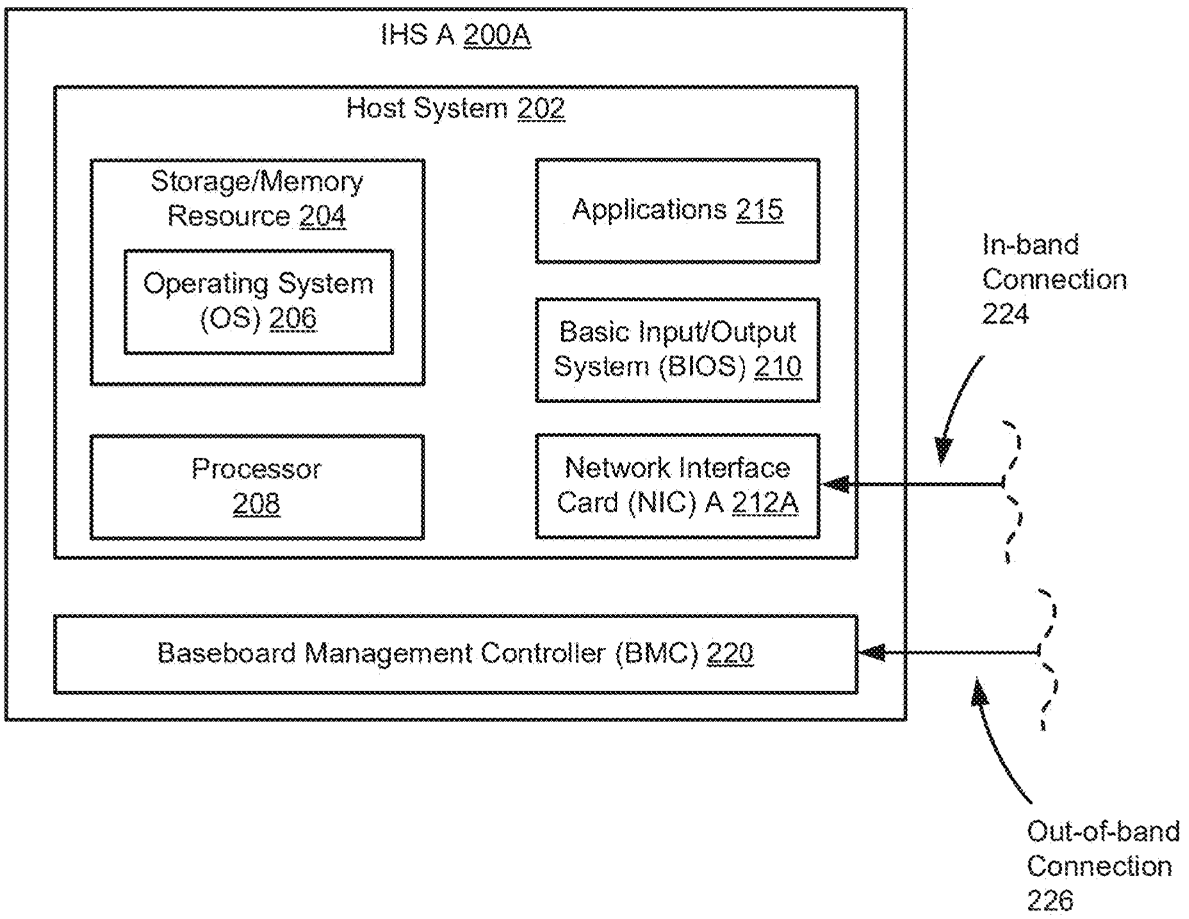
FIG. 2.1

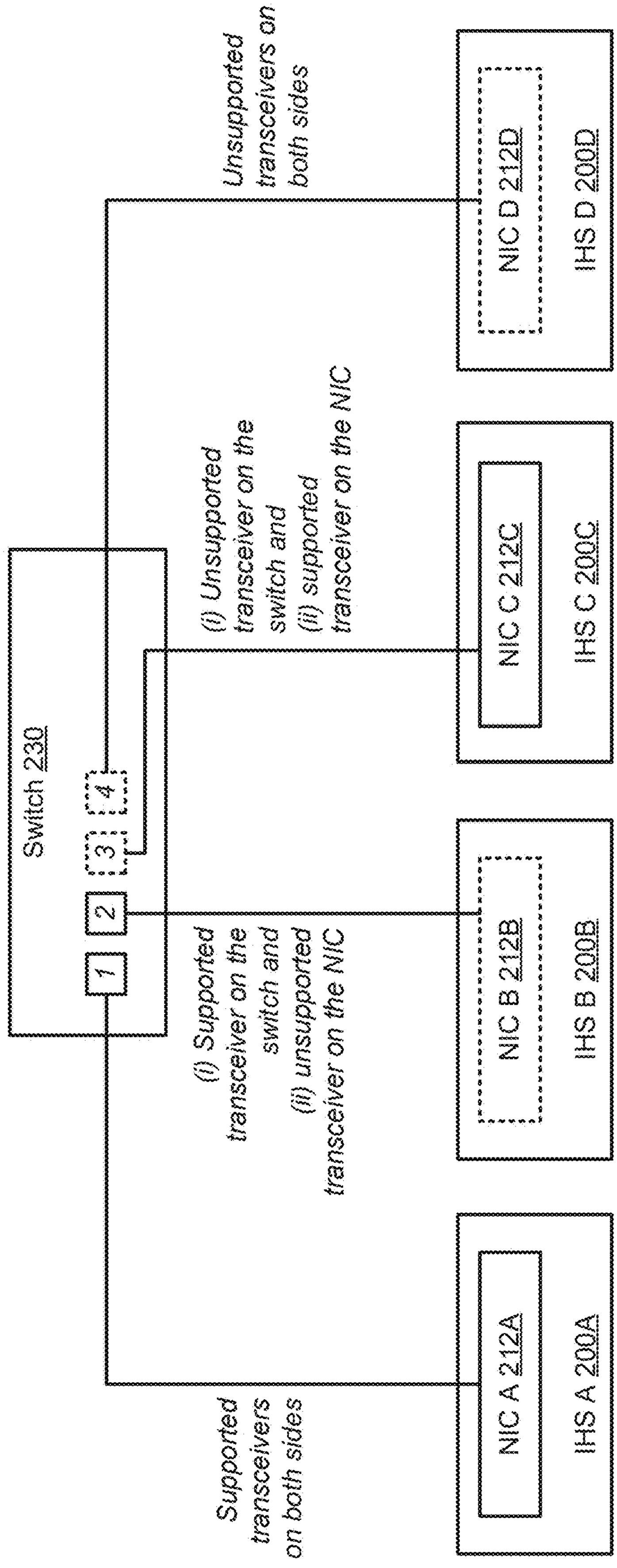
FIG. 2.2

*An example mapping between a related NIC's unique identifiers (e.g., part numbers (PNs)) to PNs of inserted transceivers*

```
{ "NIC_PNs-to-transceiver_PNs":
 {{ "ABC" {
  "Network Device Name": "AB Ethernet Converged Network Adapter X888",
  "Network Device Slot": 1,
  "Transceivers": {
   "Port 1": {
    "Transceiver Name": "DAC-RRR",
    "PN": "TCPM2",}
   "Port 2": {
    "Transceiver Name": "DAC-TTT",
    "PN": "27GG5",}
   "Port 3": {
    "Transceiver Name": "YY-55",
    "PN": "JNPF8",}
   "Port 4": {
    "Transceiver Name": "YY-55",
    "PN": "JNPF8",}}},

 "XYZ" {
  "Network Device Name": "YU Dual Port PCIE Adapter",
  "Network Device Slot": 2,
  "Transceivers": {
   "Port 1": {
    "Transceiver Name": "10H AOC",
    "PN": "W5G04",}
   "Port 2": {
    "Transceiver Name": "25H DAC",
    "PN": "58KM3",}}}}}
```

FIG. 2.3

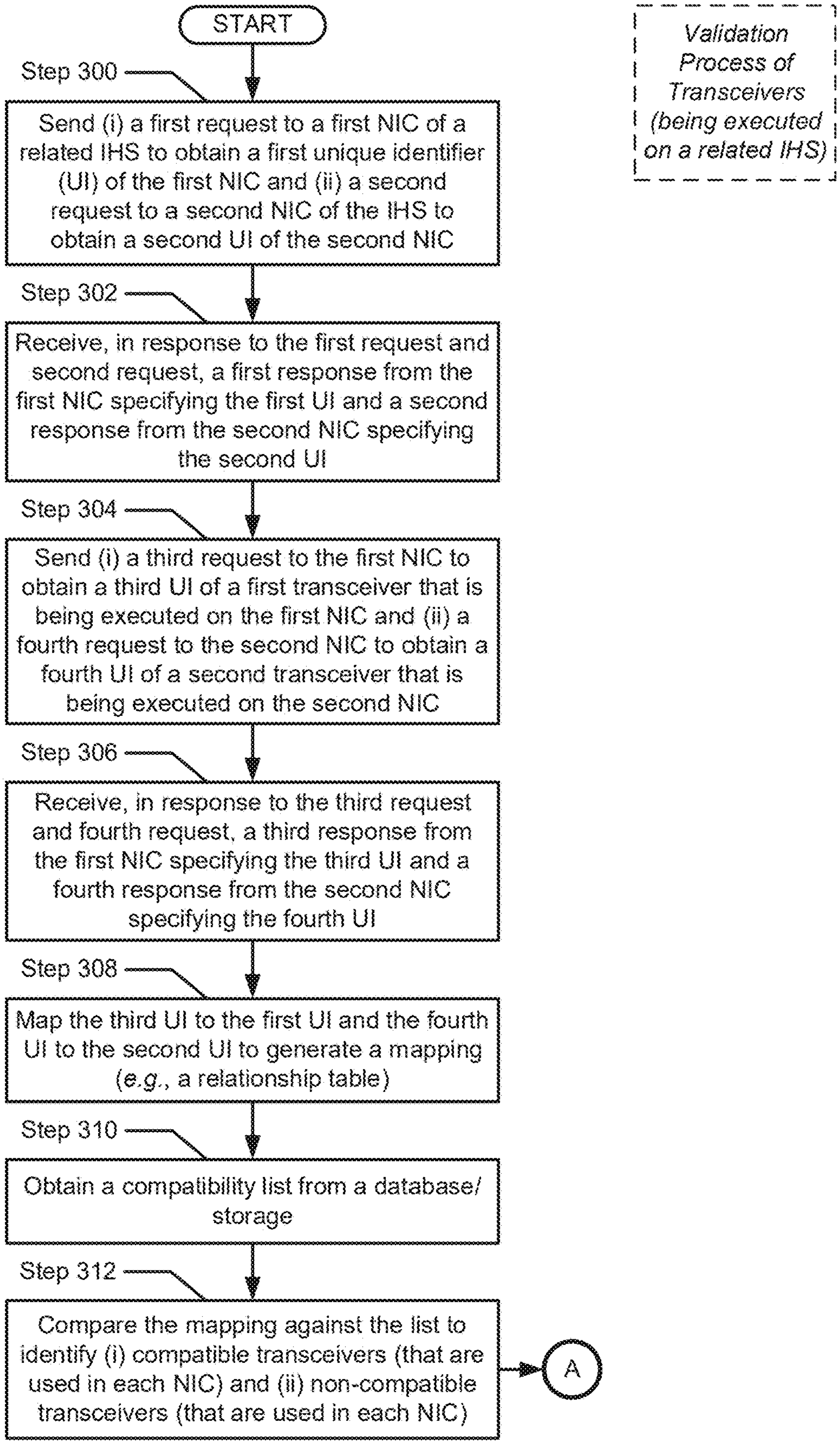
FIG. 3.1

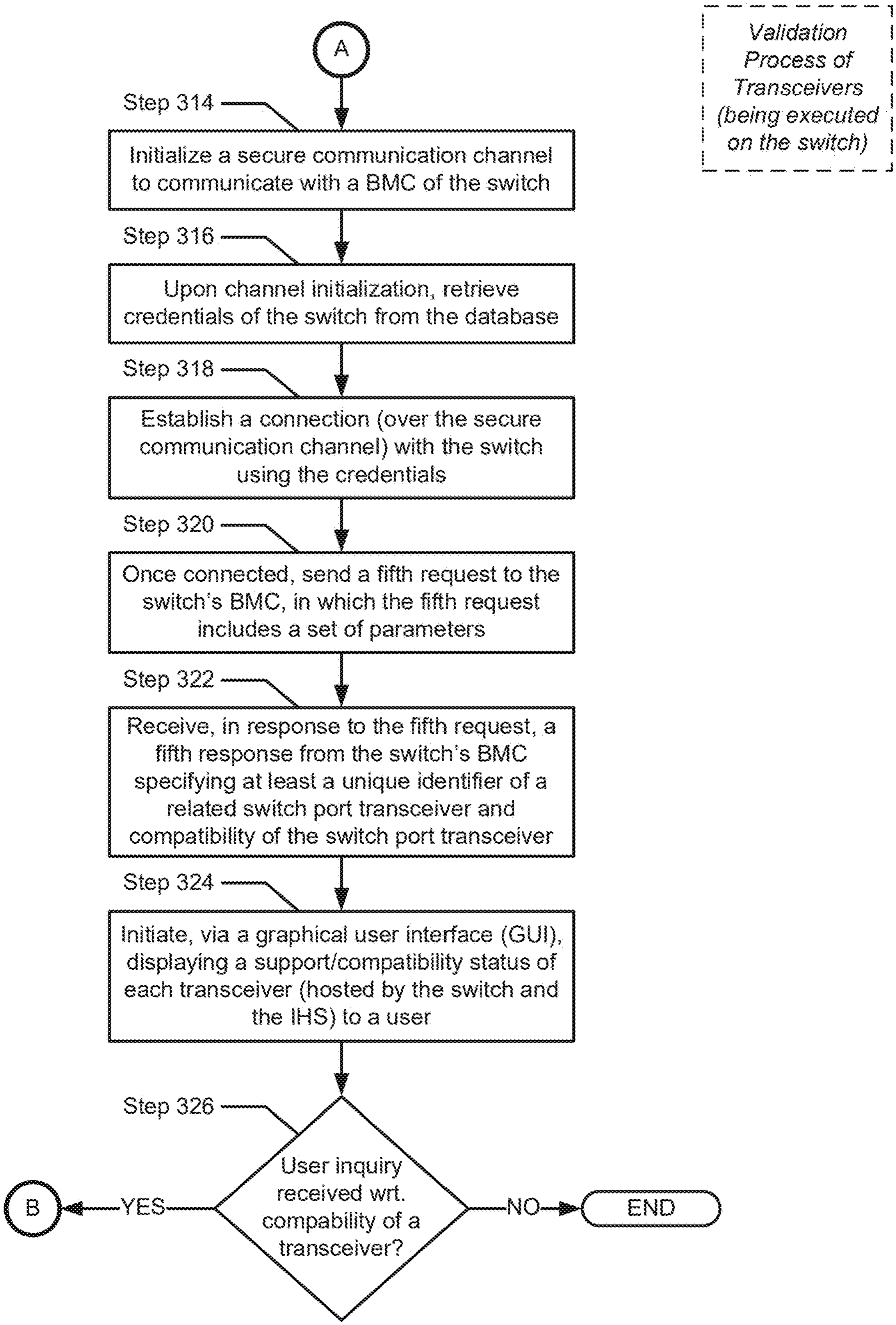
FIG. 3.2

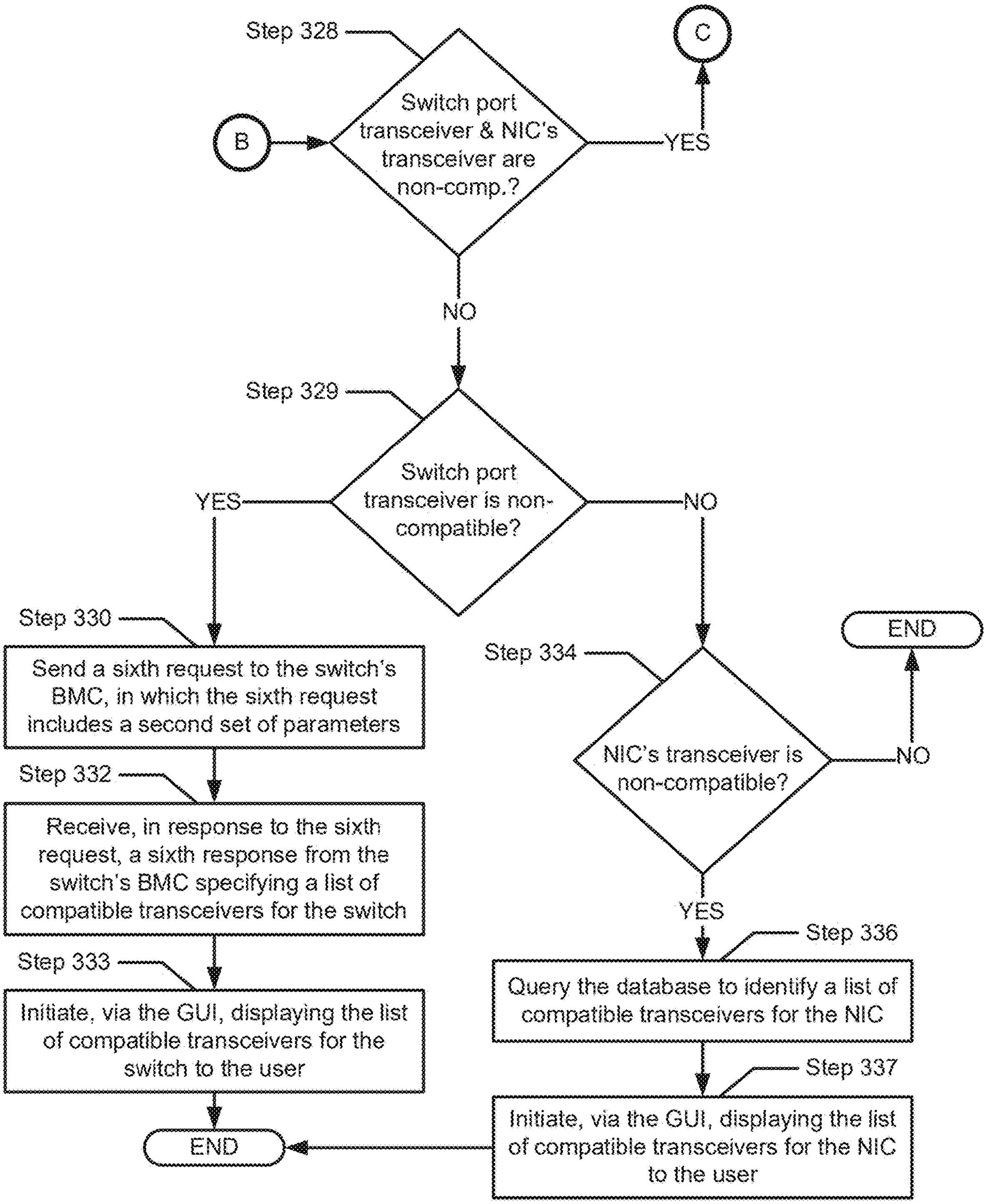
FIG. 3.3

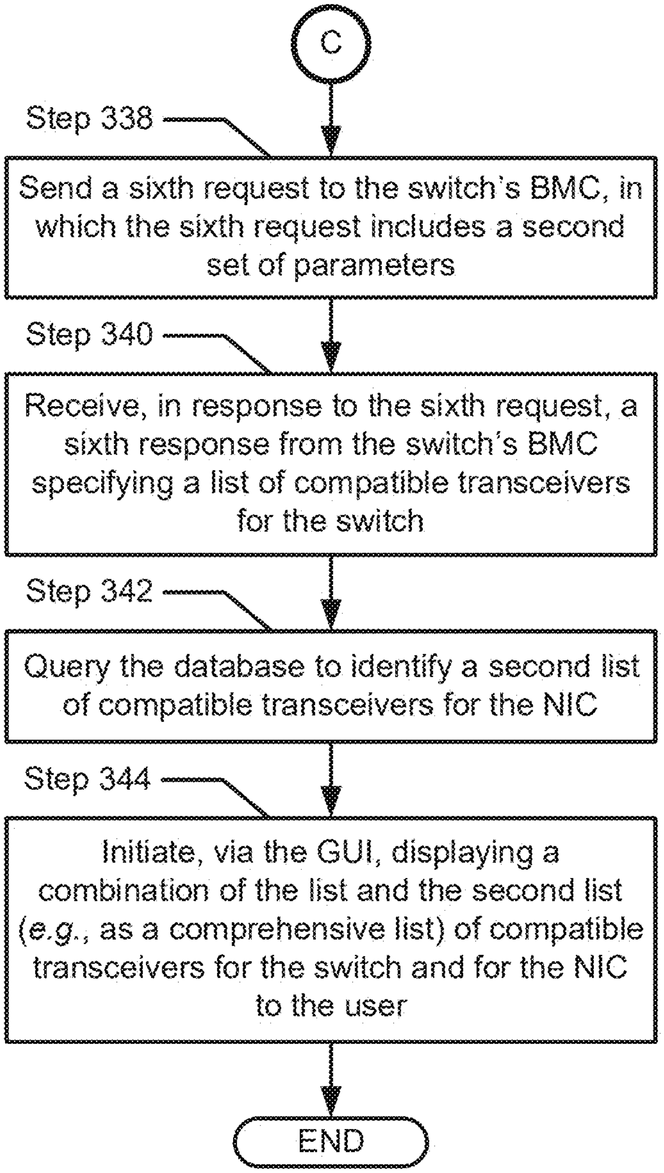
FIG. 3.4

MANAGING COMPATIBILITY OF TRANSCEIVERS USED IN INTER-CONNECTED SYSTEMS

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 2.1 shows a diagram of an information handling system (IHS) in accordance with one or more embodiments disclosed herein.

FIG. 2.2 shows an example combination of transceiver compatibilities in accordance with one or more embodiments disclosed herein.

FIG. 2.3 shows an example mapping between a network interface card's (NIC) unique identifiers to unique identifiers of inserted transceivers in accordance with one or more embodiments disclosed herein.

FIGS. 3.1-3.4 show a method for managing compatibility of transceivers in accordance with one or more embodiments disclosed herein.

DETAILED DESCRIPTION

Figure 1:
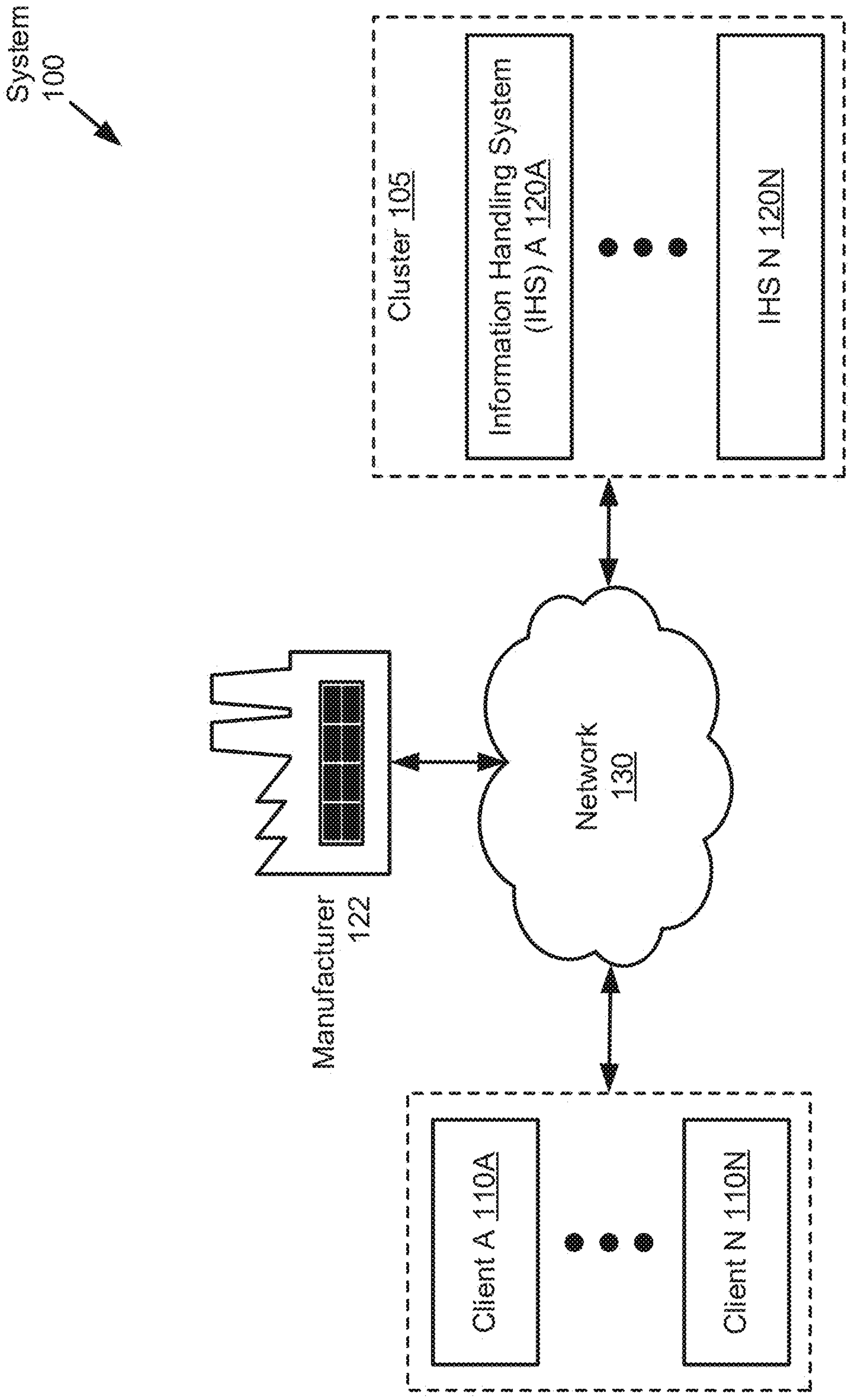
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, organizations (e.g., companies, entities, etc.) face a challenge with a complex matrix of supported cables and optics. The extensive permutations of network adapters (or NICs), cables, and optics generate a large and intricate support matrix (e.g., a spreadsheet that has, at least, information with respect to cables, transceivers, optics, etc., that are obtained/procured from different vendors). In most cases, different teams of an organization keep/maintain different support matrices. For example, while a communications team of an organization maintaining its own support matrix, a networking/switch team (of the organization) may maintain a separate support matrix for validated transceivers and cables.

Customers (e.g., users, humans, etc.) frequently raise support calls and questions regarding compatibility issues (e.g., issues with respect to the compatibility of a transceiver on a network adapter, "are there NICs that do not support RJ-45/copper sfp+ transceivers?", etc.). The related support team often relies on their own spreadsheets (e.g., derived from an engineering support matrix) for reference. However, this information quickly becomes outdated as the support matrix evolves with the addition of newer parts and the obsolescence (or end-of-support) of older parts. Further, while conventional solutions/approaches may verify if a transceiver is supported on a single system (e.g., an IHS, a switch, etc.), these solutions do not account for the complexity of compatibility between two inter-connected systems.

For at least the reasons discussed above and without requiring resource-intensive efforts (e.g., time, engineering, etc.), a fundamentally different approach/framework is needed (e.g., a framework to tackle compatibility issues between two entities (e.g., between two inter-connected systems): (i) a related switch (e.g., a top-of-rack switch) and NICs of a corresponding server/IHS).

Embodiments disclosed herein relate to methods and systems for managing compatibility of transceivers. As a result of the processes discussed below, one or more embodiments disclosed herein advantageously ensure that (at least, for example, for a better user experience): (i) by leveraging automated validation processes and secure communication channels, the framework enables, at least, (a) detecting/validating the compatibility of transceivers in switches and servers/IHSs within a network environment (e.g., a cluster, see FIG. 1) and (b) accurate assessment of the compatibility of transceivers (or transceiver modules) across inter-connected systems; (ii) at least a portion of the framework (e.g., user-friendly, real-time reporting interfaces) provides users (e.g., network administrators) with (a) actionable insights into the compatibility status of each transceiver across the inter-connected systems and (b) recommendations for resolving any detected issues about the transceivers; (iii) the framework, at least, (a) streamlines deployment of transceivers, (b) enhances reliability of transceivers, and (c) minimizes compatibility-related downtime of transceivers across the inter-connected systems, ultimately improving network performance and operational efficiency of those systems; (iv) the framework enables users/administrators to address the complexity of NIC, switch, and transceivers compatibility checks; (v) the framework helps customers/administrators to easily validate one or more transceivers used in/across inter-connected systems (e.g., IHSs and switches); (vi) the framework lists/displays/recommends supported/compatible transceivers to customers to choose so that the customers can avoid using/inserting unsupported/non-compatible transceivers in their systems; and/or (vii) the framework provides/displays a real-time (or near real-time) feedback (to customers) on transceiver compatibility status in order to, for example, avoid receiving lots of influx calls at a related organization's customer support center.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a network (130), any number of clusters (e.g., Cluster (105)) (where each cluster may include/host any number of IHSs (e.g., IHS A (120A), IHS N (120N), etc.)), and a manufacturer (122). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the IHSs (e.g., 120A, 120N, etc.), and the network (130) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IHSs (e.g., 120A, 120N, etc.) are shown to be operatively connected through a communication network (e.g., 130), the clients (e.g., 110A, 110N, etc.) and the IHSs (e.g., 120A, 120N, etc.) may be directly connected (e.g., without an intervening communication network).

Further, the functioning of the clients (e.g., 110A, 110N, etc.) and the IHSs (e.g., 120A, 120N, etc.) is not dependent upon the functioning and/or existence of the other components (e.g., devices) in the system (100). Rather, the clients (e.g., 110A, 110N, etc.) and the IHSs (e.g., 120A, 120N, etc.) may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 400, FIG. 4) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users'site using the clients (e.g., 110A, 110N, etc.)) and other computations remotely (e.g., away from the users'site using the IHSs (e.g., 120A, 120N, etc.)) from the users. By doing so, the users may utilize different computing devices (e.g., 400, FIG. 4) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an Internet of Things (IOT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IHSs (e.g., 120A, 120N, etc.)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to an IHS (e.g., 120A). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or computing device operated by one or more individuals of (or employed by) an organization. Examples of said individual(s) may include, but not limited to, any organization executive(s) (e.g., chief executive officer (CEO), chief financial officer (CFO), etc.) and any employee(s) in the data management team of the organization (e.g., an administrator). Further, the organization may refer to any enterprise at least engaged in for-profit commercial, industrial, or professional activities.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with an IHS (e.g., 120A). For example, the clients may issue requests to the IHS to receive responses and interact with various components of the IHS. The clients may also request data from and/or send data to the IHS (for example, the clients may transmit information to the IHS that allows the IHS to perform computations, the results of which are used by the clients to provide services to the users). As yet another example, the clients may utilize computer-implemented services provided by the IHS. When the clients interact with the IHS, data that is relevant to the clients may be stored (temporarily or permanently) in the IHS.

In one or more embodiments, a client (e.g., 110A, 110N, etc.) may be capable of, e.g.: (i) collecting users'inputs, (ii) correlating collected users'inputs to the computer-implemented services to be provided to the users, (iii) communicating with an IHS (e.g., 120A) that perform computations necessary to provide the computer-implemented services, (iv) using the computations performed by the IHS to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IHS (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high-speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a NIC/network adapter, a network processor, etc.

In one or more embodiments, a networking resource may provide capabilities to interface a client with external entities (e.g., 120A, 120N, etc.) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be taken into account without departing from the scope of the embodiments disclosed herein.

Figure 4:
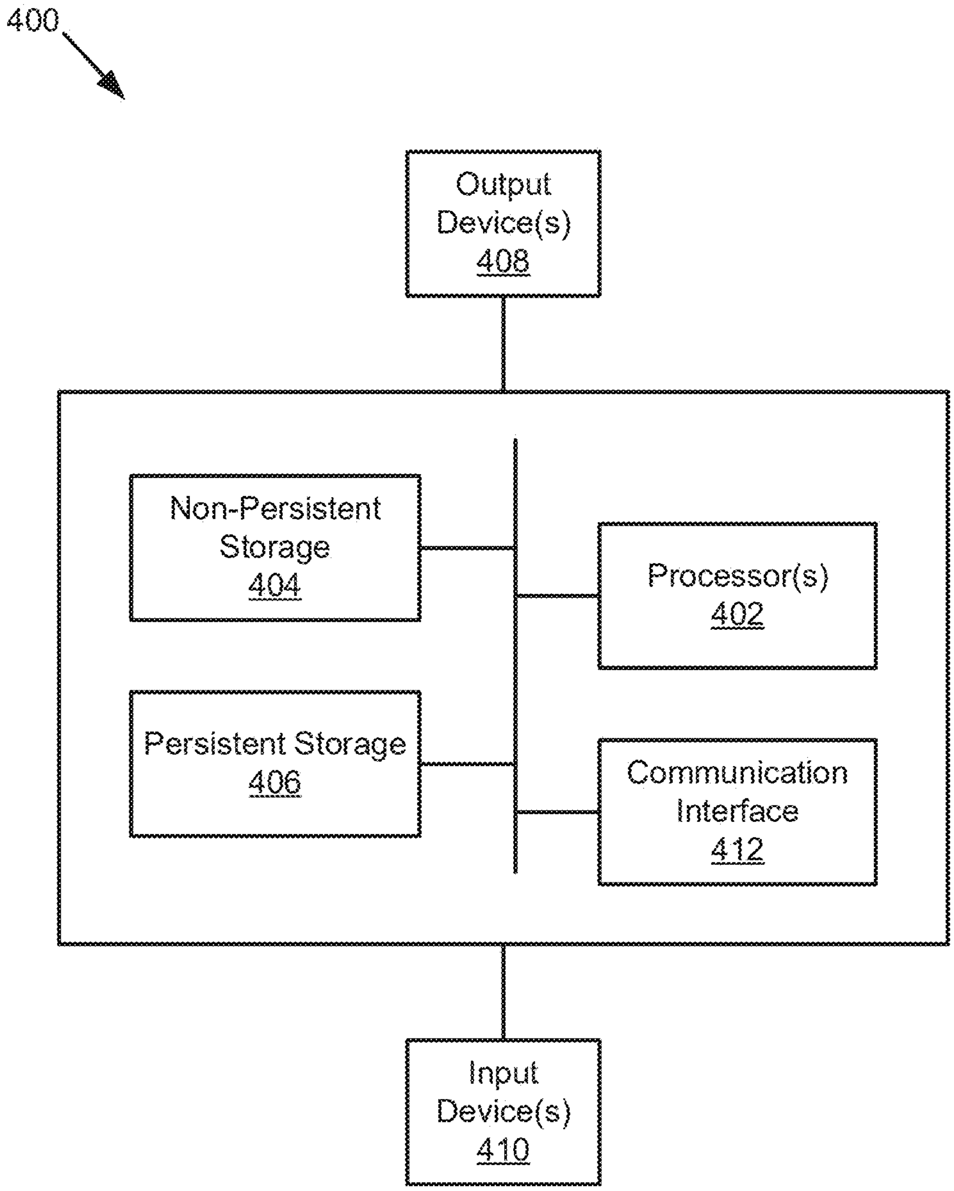
FIG. 4 shows a diagram of a computing device in accordance with one or more embodiments disclosed herein.

Further, in one or more embodiments, a client (e.g., 110A, 110N, etc.) may be implemented as a computing device (e.g., 400, FIG. 4). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, organization executives, people, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user/person/human with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 400, FIG. 4) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the cluster (105) may represent, for example, a network environment (e.g., a public network environment, a private network environment, etc.). Further, the cluster (105) may correspond to a geographic region in the world and/or a zone (e.g., a business operation zone) of an organization.

In one or more embodiments, an IHS (e.g., 120A) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, an IHS (e.g., 120A) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to a database (not shown) for management of the data and/or for storage of the data (while pushing the data, the IHS may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IHS (e.g., 120N) for review and/or other human interactions; (x)

exchange data with other devices registered in/to the network (130) in order to, for example, participate in a collaborative workload placement (e.g., the IHS may split up a request (e.g., an operation, a task, an activity, etc.) with another IHS, coordinating its efforts to complete the request more efficiently than if the IHS had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to the database; (xv) provide (e.g., via a broadcast, multicast, or unicast mechanism) information (e.g., a location identifier, the amount of available resources, etc.) associated with the IHS to other IHSs of the system (100); (xvi) configure or control any mechanism that defines when, how, and what data to provide to the clients and/or database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., the IHS may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IHS may communicate with, for example, the database and/or other storage devices in the system (100).

As described above, an IHS (e.g., 120A) may be capable of providing a range of functionalities/services to the users of the clients (e.g., 110A, 110N, etc.). However, not all of the users may be allowed to receive all of the services. To manage the services provided to the users of the clients, a system (e.g., a service manager) in accordance with embodiments disclosed herein may manage the operation of a network (e.g., 130), in which the clients are operably connected to the IHS. Specifically, the service manager (i) may identify services to be provided by the IHS (for example, based on the number of users using the clients) and (ii) may limit communications of the clients to receive IHS provided services.

For example, the priority (e.g., the user access level) of a user may be used to determine how to manage computing resources of the IHS to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IHS (e.g., while the computing resources of the IHS may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high-priority user (e.g., a privileged user, a user with a user access level of 9/10). In such a case, the user level of that user may indicate that more ports are to be opened than were for the first user so that (i) the IHS may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

Further, while a single IHS (e.g., 120A) is considered above, the term "IHS" includes any collection of systems or sub-systems that individually or jointly execute a set, or multiple sets, of instructions to provide one or more computer-implemented services. For example, a single IHS may provide a computer-implemented service on its own (i.e., independently) while multiple other IHSs may provide a second computer-implemented service cooperatively (e.g., each of the multiple other IHSs may provide similar and or different services that form the cooperatively provided service).

As described above, an IHS (e.g., 120A) may provide any quantity and any type of computer-implemented services. To provide computer-implemented services, the IHS may be a heterogeneous set, including a collection of physical computing components/resources configured to perform operations of the IHS and/or otherwise execute a collection of logical computing components/resources of the IHS.

In one or more embodiments, a "computing" resource (e.g., a measurable quantity of a compute-relevant resource type that may be requested, allocated, and/or consumed) may be (or may include), for example (but not limited to): a CPU, a GPU, a DPU, memory, a network resource, storage space (e.g., to store any type and quantity of information), storage input/output, a hardware resource set, a compute resource set (e.g., one or more processors, processor dedicated memory, etc.), a control resource set, etc.

In one or more embodiments, resources (or computing resources) of an IHS (e.g., 120A) may be divided into three logical resource sets: a compute resource set, a control resource set, and a hardware resource set. Different resource sets, or portions thereof, from the same or different IHSs may be aggregated (e.g., caused to operate as a computing device) to instantiate a composed IHS having at least one resource set from each set of the three resource set model.

In one or more embodiments, a hardware resource set (e.g., of an IHS) may include (or specify), for example (but not limited to): a configurable CPU option (e.g., a valid/legitimate vCPU count per-IHS option), a minimum user count per-IHS, a maximum user count per-IHS, a configurable network resource option (e.g., enabling/disabling single-root input/output virtualization (SR-IOV) for specific IHSs), a configurable memory option (e.g., maximum and minimum memory per-IHS), a configurable GPU option (e.g., allowable scheduling policy and/or vGPU count combinations per-IHS), a configurable DPU option (e.g., legitimacy of disabling inter-integrated circuit (I2C) for various IHSs), a configurable storage space option (e.g., a list of disk cloning technologies across all IHSs), a configurable storage input/output option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template, a 10 GB/s BW with 10 ms latency QoS template, etc.), a DPU related template (e.g., a 1 GB/s BW vDPU with 1 GB vDPU frame buffer template, a 2 GB/s BW vDPU with 1 GB vDPU frame buffer template, etc.), a GPU related template (e.g., a depth-first vGPU with 1 GB vGPU frame buffer template, a depth-first vGPU with 2 GB vGPU frame buffer template, etc.), a storage space related template (e.g., a 40 GB SSD storage template, an 80 GB SSD storage template, etc.), a CPU related template (e.g., a 1 vCPU with 4 cores template, a 2 vCPUs with 4 cores template, etc.), a memory related template (e.g., a 4 GB DRAM template, an 8 GB DRAM template, etc.), a speed select technology configuration (e.g., enabled, disabled, etc.), a virtual NIC (vNIC) count per-IHS, a wake on LAN support configuration (e.g., supported/enabled, not supported/disabled, etc.), a swap space configuration per-IHS, a reserved memory configuration (e.g., as a percentage of configured memory such as 0-100%), a memory ballooning configuration (e.g., enabled, disabled, etc.), a vGPU count per-IHS, a type of a vGPU scheduling policy (e.g., a "fixed share" vGPU scheduling policy, an "equal share" vGPU scheduling policy, etc.), a type of a GPU virtualization approach (e.g., graphics vendor native drivers approach such as a vGPU), a storage mode configuration (e.g., an enabled high-performance storage array mode, a disabled high-performance storage array mode, an enabled general storage (i.e., co-processor) mode, a disabled general storage mode, etc.), a backup frequency (e.g., hourly, daily, monthly, etc.), a hardware virtualization configuration, etc.

In one or more embodiments, a control resource set (e.g., of an IHS) may facilitate formation of composed IHSs. To do so, a control resource set may prepare any quantity of computing resources from any number of hardware resource sets (e.g., of the corresponding IHS and/or other IHSs) for presentation. Once prepared, the control resource set may present the prepared computing resources as bare metal resources to an orchestrator (not shown). By doing so, a composed IHS may be instantiated.

To prepare the computing resources of the hardware resource sets for presentation, the control resource set may employ, for example, virtualization, indirection, abstraction, and/or emulation. These management functionalities may be transparent to applications hosted by the resulting composed IHS (e.g., thereby relieving those applications from workload overhead). Consequently, while unknown to components of a composed IHS, the composed IHS may operate in accordance with any number of management models thereby providing for unified control and management of the composed IHS.

In one or more embodiments, the orchestrator may implement a management model to manage computing resources (e.g., computing resources provided by one or more hardware components/devices of IHSs) in a particular manner. The management model may give rise to additional functionalities for the computing resources. For example, the management model may be automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and numbers of management models may be implemented to provide additional functionalities using the computing resources without departing from the scope of the embodiments disclosed herein.

In one or more embodiments, in conjunction with the orchestrator, a system control processor (not shown) of a related IHS may cooperatively enable hardware resource sets of other IHSs to be prepared and presented as bare metal resources to composed IHSs. The system control processor may be operably connected to external resources (not shown) via a NIC (e.g., 212A, FIG. 2.1) and the network (130) so that the system control processor may prepare and present the external resources as bare metal resources as well.

In one or more embodiments, a compute resource set, a control resource set, and/or a hardware resource set may be implemented as separate physical devices. In such a scenario, any of these resource sets may include NICs or other devices to enable the hardware devices of the respective resource sets to communicate with each other.

While an IHS (e.g., 120A) has been illustrated and described as including a limited number of specific components and/or hardware resources, the IHS (e.g., 120A) may include additional, fewer, and/or different components without departing from the scope of the embodiments disclosed herein. One of ordinary skill will appreciate that an IHS (e.g., 120A) may perform other functionalities without departing from the scope of the embodiments disclosed herein.

In one or more embodiments, the IHSs (e.g., 120A, 120N, etc.) are demonstrated as being part of the cluster (105); however, embodiments disclosed herein are not limited as such. In the embodiments of the present disclosure, an IHS (e.g., 120A, 120N, etc.) may be demonstrated as not being part of the cluster (105).

In one or more embodiments, an IHS (e.g., 120A) may be implemented as a computing device (e.g., 400, FIG. 4). The computing device may be, for example, a mobile phone, a tablet computer, a laptop computer, a desktop computer, a server, a distributed computing system, or a cloud resource.

The computing device may include one or more processors, memory (e.g., RAM), and persistent storage (e.g., disk drives, SSDs, etc.). The computing device may include instructions, stored to the persistent storage, that when executed by the processor(s) of the computing device cause the computing device to perform the functionality of the IHS described throughout the application.

Alternatively, in one or more embodiments, similar to a client (e.g., 110A), the IHS (e.g., 120A) may also be implemented as a logical device.

Turning now to the manufacturer (122), as being a trusted facility/site, the manufacturer (122) may be part of a supply chain route (that may be traversed by an enterprise product (e.g., an IHS)), in which the supply chain route may outline a sequence of trusted sites through which the enterprise product transitions during its lifetime.

In one or more embodiments, the manufacturer (122) may reference a trusted facility where a supplier of an enterprise product (e.g., a physical product such as an edge device, a logical product such as a software program or an application, etc.) may manufacture the enterprise product in part or in entirety. Manufacturing of an enterprise product may include one or more steps/stages, for example (but not limited to): steps of a developer/administrator flow of an application; steps of generating an ownership voucher (OV) (based on the credentials specified in device initialization (DI) process/protocol (where the OV may not be stored in the corresponding edge device; instead, the OV may be transmitted along the supply chain route to mirror the edge device's progress); steps of initial provisioning of an edge device; steps of generating a public and private key pair for an edge device (before shipping the edge device to a user/customer), where the public key of the key pair is embedded into a corresponding OV; manufacturing of chassis and front panel parts; subassembly of chassis parts to obtain a chassis; integration of a chassis and front panel parts to obtain a chassis enclosure; procurement of a power supply and/or cables and/or a backplane; integration of a power supply and/or cables and/or a backplane into a chassis enclosure; procurement of a baseboard and integration thereof into a chassis enclosure; procurement of one or more expansion cards and integration thereof into a chassis enclosure; procurement of one or more storage devices and integration thereof into a chassis enclosure; procurement of parts such as computer processors (e.g., CPUs, DPUs, etc.) as well as computer memory and integration thereof into a chassis enclosure to obtain a fully-assembled enterprise product; installation of an OS, zero or more software applications, and/or firmware onto a fully-assembled enterprise product to obtain a fully-integrated enterprise product; etc.

In one or more embodiments, the aforementioned enterprise product manufacturing steps may be performed across one or more manufacturers. Further, the manufacturer (122) may include functionality to service, upgrade, troubleshoot, test, package, and/or distribute various different enterprise products. One of ordinary skill will appreciate that the manufacturer (122) may perform other functionalities without departing from the scope of the embodiments disclosed herein.

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IHSs through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

While FIG. 1 shows a configuration of components, other system configurations may be used without departing from the scope of the embodiments disclosed herein.

Turning now to FIG. 2.1, FIG. 2.1 shows a diagram of an IHS (e.g., IHS A) in accordance with one or more embodiments disclosed herein. IHS A (200A) may be an example of an IHS discussed above in reference to FIG. 1. IHS A (200A) may include (i) a host system (202) that hosts a storage/memory resource (204), a processor (208), a BIOS (210) (e.g., a unified extensible firmware interface (UEFI) BIOS), any number of applications (215), and a NIC (e.g., NIC A 212A) and (ii) a baseboard management controller (BMC) (220) that hosts a processor (not shown) and a NIC (not shown). IHS A (200A) may include additional, fewer, and/or different components without departing from the scope of the embodiments disclosed herein. Each component may be operably connected to any of the other component via any combination of wired and/or wireless connections. Each component illustrated in FIG. 2.1 is discussed below.

In one or more embodiments, the processor (208) (e.g., a node processor, one or more processor cores, one or more processor micro-cores, etc.) may be communicatively coupled to the storage/memory resource (204), the BIOS (210), the applications (215), and NIC A (212A) via any suitable interface, for example, a system interconnect including one or more system buses (operable to transmit communication between various hardware components) and/or peripheral component interconnect express (PCIe) bus/interface. In one or more embodiments, the processor (208) may be configured for executing machine-executable code like a CPU, a programmable logic array (PLA), an embedded device such as a System-on-a-Chip (SoC), or hardware/software control logic.

More specifically, the processor (208) may include any system, device, or apparatus configured to interpret and/or execute program instructions and/or process data, and may include, without limitation, a memory controller, microprocessor, a microcontroller, a digital signal processor (DSP), an ASIC, or any other digital or analog circuitry configured to interpret and/or execute program instructions and/or process data. In one or more embodiments, the processor (208) may interpret and/or execute program instructions and/or process data stored to the storage/memory resource (204) and/or another component of IHS A (200A).

In one or more embodiments, the processor (208) may utilize NIC A (212A) to communicate with other devices to manage (e.g., instantiate, monitor, modify, etc.) composed IHSs. Additionally, the processor (208) may manage operation of hardware devices of IHS A (200A) in accordance with one or more models including, for example, data protection models, security models such as encrypting stored data, workload performance availability models such as implementing statistic characterization of workload performance, reporting models, etc. For example, the processor (208) may instantiate redundant performance of workloads for high-availability services.

In one or more embodiments, the processor (208) may facilitate instantiation of composed IHSs. By doing so, a system that includes IHSs may dynamically instantiate composed IHSs to provide computer-implemented services.

While the processor (208) has been illustrated and described as including a limited number of specific components, the processor (208) may include additional, fewer, and/or different components without departing from the scope of the embodiments disclosed herein. One of ordinary skill will appreciate that the processor (208) may perform other functionalities without departing from the scope of the embodiments disclosed herein. The processor (208) may be implemented using hardware (e.g., a physical device including circuitry), software, or any combination thereof.

In one or more embodiments, when two or more components are referred to as "coupled" to one another, such term indicates that such two or more components are in electronic communication or mechanical communication, as applicable, whether connected directly or indirectly, with or without intervening components.

In one or more embodiments, the storage/memory resource (204) may have or provide at least the functionalities and/or characteristics of the storage or memory resources described above in reference to FIG. 1. The storage/memory resource (204) may include any instrumentality or aggregation of instrumentalities that may retain data (e.g., OS data, tamper-protected data, application data, etc.), program instructions, applications, and/or firmware (temporarily or permanently). In one or more embodiments, software and/or firmware stored within the storage/memory resource (204) may be loaded into the processor (208) and executed during operation of IHS A (200A).

Further, the storage/memory resource (204) may include, without limitation, (i) storage media such as a direct access storage device (e.g., an HDD or a floppy disk), a sequential access storage device (e.g., a tape disk drive), compact disk, CD-ROM, DVD, RAM, DRAM, read-only memory (ROM), electrically erasable programmable read-only memory (EEPROM), magnetic storage, opto-magnetic storage, and/or volatile or non-volatile memory (e.g., Flash memory) that retains data after power to IHS A (200A) is turned off; (ii) communications media such as wires, optical fibers, microwaves, radio waves, and other electromagnetic and/or optical carriers; and/or any combination of thereof.

Although the storage/memory resource (204) is depicted as integral to the host system (202), in some embodiments, all or a portion of the storage/memory resource (204) may reside external to the host system (202).

In one or more embodiments, the OS (206) may include any program of executable instructions (or aggregation of programs of executable instructions) configured to manage and/or control the allocation and usage of hardware resources such as memory, processor time, disk space, and input/output devices, and provide an interface between such hardware resources and applications hosted by the OS (206). Further, the OS (206) may include all or a portion of a network stack for network communication via a network interface (e.g., NIC A (212A) for communication over a data network (e.g., an in-band connection (224))).

In one or more embodiments, active portions of the OS (206) may be transferred to the storage/memory resource (204) for execution by the processor (208). Although the OS (206) is shown in FIG. 2.1 as stored to the storage/memory resource (204), in some embodiments, the OS (206) may be stored to external storage media accessible to the processor (208), and active portions of the OS (206) may be transferred from such external storage media to the storage/memory resource (204) for execution by the processor (208).

In one or more embodiments, the firmware stored to the storage/memory resource (204) may include power profile data and thermal profile data for certain hardware devices (e.g., the processor (208), the BIOS (210), NIC A (212A), input/output controllers, etc.). Further, the storage/memory resource (204) may include a UEFI interface (not shown) for accessing the BIOS (210) as well as updating the BIOS (210). In most cases, the UEFI interface may provide a software interface between the OS (206) and the BIOS (210), and may support remote diagnostics and repair of hardware devices, even with no OS is installed.

In one or more embodiments, the input/output controllers (not shown) may manage the operation(s) of one or more input/output device(s) (connected/coupled to IHS A (200A)), for example (but not limited to): a keyboard, a mouse, a touch screen, a microphone, a monitor or a display device, a camera, an optical reader, a USB, a card reader, a personal computer memory card international association (PCMCIA) slot, a high-definition multimedia interface (HDMI), etc.

In one or more embodiments, the storage/memory resource (204) may store data structures including, for example (but not limited to): composed system data, a resource map, a computing resource health repository, application data, etc.

In one or more embodiments, the composed system data may be implemented using one or more data structures that includes information regarding composed IHSs. For example, the composed system data may specify identifiers of composed IHSs, and resources that have been allocated to the composed IHSs.

The composed system data may also include information regarding the operation of the composed IHSs. The information (which may be utilized to manage the operation of the composed IHSs) may include (or specify), for example (but not limited to): workload performance data, resource utilization rates over time, management models employed by the processor (208), etc. For example, the composed system data may include information regarding duplicative data stored for data integrity purposes, redundantly performed workloads to meet high-availability service requirements, encryption schemes utilized to prevent unauthorized access of data, etc.

The composed system data may be maintained by, for example, a composition manager (e.g., of IHS A (200A)). For example, the composition manager may add, remove, and/or modify information included in the composed system data to cause the information included in the composed system data to reflect the state of the composed IHSs. The data structures of the composed system data may be implemented using, for example, lists, tables, unstructured data, databases, etc. While illustrated as being stored locally, the composed system data may be stored remotely and may be distributed across any number of devices without departing from the scope of the embodiments disclosed herein.

In one or more embodiments, the resource map may be implemented using one or more data structures that include information regarding resources of IHS A (200A) and/or other IHSs. For example, the resource map may specify the type and/or quantity of resources (e.g., hardware devices, virtualized devices, etc.) available for allocation and/or that are already allocated to composed IHSs. The resource map may be used to provide data to management entities.

The data structures of the resource map may be implemented using, for example, lists, tables, unstructured data, databases, etc. While illustrated as being stored locally, the resource map may be stored remotely and may be distributed across any number of devices without departing from the scope of the embodiments disclosed herein. The resource map may be maintained by, for example, the composition manager. For example, the composition manager may add, remove, and/or modify information included in the resource map to cause the information included in the resource map to reflect the state of IHS A (200A) and/or other IHSs.

In one or more embodiments, the computing resource health repository may be implemented using one or more data structures that includes information regarding the health of hardware devices that provide computing resources to composed IHSs. For example, the computing resource health repository may specify operation errors, health state information, temperature, and/or other types of information indicative of the health of hardware devices.

The computing resource health repository may specify the health states of hardware devices via any method. For example, the computing resource health repository may indicate whether, based on the aggregated health information, that the hardware devices are or are not in compromised states. A compromised health state may indicate that the corresponding hardware device has already or is likely to, in the future, be no longer able to provide the computing resources that it has previously provided. The health state determination may be made via any method based on the aggregated health information without departing from the scope of the embodiments disclosed herein. For example, the health state determination may be made based on heuristic information regarding previously observed relationships between health information and future outcomes (e.g., current health information being predictive of whether a hardware device will be likely to provide computing resources in the future).

The computing resource health repository may be maintained by, for example, the composition manager. For example, the composition manager may add, remove, and/or modify information included in the computing resource health repository to cause the information included in the computing resource health repository to reflect the current health of the hardware devices that provide computing resources to the composed IHSs.

The data structures of the computing resource health repository may be implemented using, for example, lists, tables, unstructured data, databases, etc. While illustrated as being stored locally, the computing resource health repository may be stored remotely and may be distributed across any number of devices without departing from the scope of the embodiments disclosed herein.

While the storage/memory resource (204) has been illustrated and described as including a limited number and type of data, the storage/memory resource (204) may store additional, less, and/or different data without departing from the scope of the embodiments disclosed herein. One of ordinary skill will appreciate that the storage/memory resource (204) may perform other functionalities without departing from the scope of the embodiments disclosed herein. The storage/memory resource (204) may be implemented using hardware, software, or any combination thereof.

In one or more embodiments, the BIOS (210) may refer to any system, device, or apparatus configured to (i) identify, test, and/or initialize information handling resources (e.g., NIC A (212A), other hardware components of IHS A (200A), etc.) of IHS A (200A) (typically during boot up or power on of IHS A (200A)), and/or initialize interoperation of IHS A (200A) with other IHSs, and (ii) load a boot loader or an OS (e.g., the OS (206) from a mass storage device). The BIOS (210) may be implemented as a program of instructions (e.g., firmware, a firmware image, etc.) that may be read by and executed on the processor (208) to perform the functionalities of the BIOS (210).

In one or more embodiments, the BIOS (210) may include boot firmware configured to be the first code executed by the processor (208) when IHS A (200A) is booted and/or powered on. As part of its initialization functionality, the boot firmware may be configured to set hardware components of IHS A (200A) into a known state, so that one or more applications (e.g., the OS (206) or other applications) stored on the storage/memory resource (204) may be executed by the processor (208) to provide computer-implemented services to one or more users of a client (e.g., 110A, FIG. 1). Further, the BIOS (210) may provide an abstraction layer for some of the hardware components of IHS A (200A), such as a consistent way for applications and OSs to interact with a keyboard, a display, and other input/output components.

One of ordinary skill will appreciate that the BIOS (210) may perform other functionalities without departing from the scope of the embodiments disclosed herein. The BIOS (210) may be implemented using hardware, software, or any combination thereof.

In one or more embodiments, as being an in-band network interface device/component, NIC A (212A) may include one or more systems, apparatuses, or devices that enable the host system (202) to communicate and/or interface with other devices (including other host systems), services, and components that are located externally to IHS A (200A). These devices, services, and components, such as one or more transceivers, may interface with the host system (202) via an external network (e.g., a shared network, a data network, an in-band network, etc.), such as the in-band connection (224) (that provides in-band access), which may include a LAN, a WAN, a PAN, the Internet, etc.

In one or more embodiments, NIC A (212A) may enable the host system (202) to communicate using any suitable transmission protocol and/or standard and NIC A (212A) may be enabled as a LAN-on-motherboard (LOM) card.

One of ordinary skill will appreciate that NIC A (212A) may perform other functionalities without departing from the scope of the embodiments disclosed herein. NIC A (212A) may be implemented using hardware, software, or any combination thereof.

As used herein, a "transceiver" (or a "transceiver module") may represent a hardware component, a software component, or any combination thereof (e.g., a combination of a transmitter and a receiver in a single package) of a NIC that transmits and receives signals over a network (or a network wire/cable) to enable/support data transmission between various computing devices (e.g., peripheral devices, storage devices, etc.). For example, a transceiver of NIC A (212A) may communicate with one or more transceivers of NIC B (e.g., 212B, FIG. 2.2) to support data transmission between IHS A (200A) and IHS B (e.g., 212A, FIG. 2.2) using a wide variety of communications interface standards.

In one or more embodiments, as being a specialized processing unit (if, for example, IHS A (200A) is a server) or an embedded controller (if, for example, IHS A (200A) is a user-level device) different from a CPU (e.g., the processor (208)), the BMC (220) may be configured to provide management/monitoring functionalities (e.g., power management, cooling management, etc.) for the management of IHS A (200A) (e.g., the hardware components and firmware in IHS A (200A), such as the BIOS firmware, the UEFI firmware, etc.). Such management may be made even if IHS A (200A) is powered off or powered down to a standby state. The BMC (220) may also, e.g.: (i) determine when one or more computing components are powered up, (ii) be programmed using a firmware stack (e.g., an iDRAC® firmware stack) that configures the BMC (220) for performing out-of-band (e.g., external to the BIOS (210)) hardware management tasks, (iii) collectively provide a system for monitoring the operations of IHS A (200A) as well as controlling certain aspects of IHS A (200A) for ensuring its proper operation, (iv) obtain computing resource capacity and availability of IHS A (200A), (v) obtain health data/statistics of each component of IHS A (200A), and/or (vi) obtain individual computing resource utilization patterns of each component of IHS A (200A).

In one or more embodiments, the BMC (220) may include (or may be an integral part of), for example (but not limited to): a chassis management controller (CMC), a remote access controller (e.g., a DRAC® or an iDRAC®), one-time programmable (OTP) memory (e.g., special non-volatile memory that permits the one-time write of data therein—thereby enabling immutable data storage), a boot loader, etc. The BMC (220) may be accessed by an administrator of IHS A (200A) via a dedicated network connection (i.e., the out-of-band connection (226)) or a shared network connection (i.e., the in-band connection (224)).

In one or more embodiments, as shown in FIG. 2.1, the BMC (220) may be a part of an integrated circuit or a chipset within IHS A (200A). Separately, the BMC (220) may operate on a separate power plane from other components in IHS A (200A). Thus, the BMC (220) may communicate with the corresponding management system via its network interface while the resources/components of IHS A (200A) are powered off.

In one or more embodiments, the boot loader may refer to a boot manager, a boot program, an initial program loader (IPL), or a vendor-proprietary image that has a functionality to, e.g.: (i) load a user's kernel from persistent storage into the main memory (or the working memory) of IHS A (200A), (ii) perform security checks for one or more hardware components of IHS A (200A), (iii) guard the device state of one or more hardware components of IHS A (200A), (iv) boot IHS A (200A), (v) ensure that all relevant OS data and other applications are loaded into the main memory of IHS A (200A) (and ready to execute) when IHS A (200A) is started, (vi) based on (v), irrevocably transfer control to the OS (206) and terminate itself, (vii) include any type of executable code for launching or booting a custom BMC firmware stack on the BMC (220), (viii) include logic for receiving user input for selecting which operational parameters may be monitored and/or processed by a coprocessor, and/or (ix) include a configuration file that may be edited for selecting (by a user) which operational parameters may be monitored and which operational parameters may be managed by a coprocessor.

One of ordinary skill will appreciate that the BMC (220) may perform other functionalities (see e.g., FIG. 3.1-3.4) without departing from the scope of the embodiments disclosed herein. The BMC (220) may be implemented using hardware, software, or any combination thereof.

In one or more embodiments, the BMC (220) may include/host a database (not shown). The database may provide long-term, durable, high read/write throughput data storage/protection with near-infinite scale and low-cost. The database may be a fully managed cloud/remote (or local) storage (e.g., cold tier storage, pluggable storage, object storage, block storage, file system storage, data stream storage, Web servers, unstructured storage, etc.) that acts as a shared storage/memory resource that is functional to store unstructured and/or structured data. Further, the database may also occupy a portion of a physical storage/memory device or, alternatively, may span across multiple physical storage/memory devices.

In one or more embodiments, the database may be implemented using physical devices that provide data storage services (e.g., storing data and providing copies of previously stored data). The devices that provide data storage services may include hardware devices and/or logical devices. For example, the database may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database may include a memory device (e.g., a dual in-line memory device), in which data is stored and from which copies of previously stored data are provided. As yet another example, the database may include a persistent storage device (e.g., an SSD), in which data is stored and from which copies of previously stored data is provided. As yet another example, the database may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database may store/record unstructured and/or structured data that may include (or specify), for example (but not limited to): an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of a client (e.g., 110A, FIG. 1)); a protocol type associated with a port number; computing resource details (including details of hardware components and/or software components) and an IP address of IHS A (200A) hosting an application where a specific request is processed; an identifier of an application (e.g., that is deployed by a manufacturer (e.g., 122, FIG. 1) to the database); information with respect to historical metadata (e.g., system logs, applications logs, telemetry data including past and present device usage of one or more computing devices in the system (e.g., 100, FIG. 1), etc.); computing resource details and an IP address of a client that sent a specific request (e.g., to IHS A (200A)); one or more points-in-time and/or one or more periods of time associated with a data recovery event; data for execution of applications/services; corpuses of annotated data used to build/generate and train processing classifiers for trained ML models; linear, non-linear, and/or ML model parameters; an identifier of a sensor; a product identifier of a client (e.g., 110A, FIG. 1); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on IHS A (200A); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by IHS A (200A); a size of each of the set of assets protected; a number of each type of a set of data protection policies implemented by a user; configuration information associated with NIC A (212A); a job detail of a job (e.g., a data protection job, a data restoration job, a log retention job, etc.) that has been initiated by IHS A (200A); a type of the job (e.g., a non-parallel processing job, a parallel processing job, an analytics job, etc.); information associated with a hardware resource set (discussed above) of IHS A (200A); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); a number of requests handled (in parallel) per minute (or per second, per hour, etc.) by the processor (208); a number of errors encountered when handling a job; a documentation that shows how the analyzer performs against an SLO and/or an SLA; information regarding an administrator (e.g., a high-priority trusted administrator, a low-priority trusted administrator, etc.) related to an analytics job; a workflow (e.g., a policy that dictates how a workload should be configured and/or protected, such as a structured query language (SQL) workflow dictates how an SQL workload should be protected) set (by a user); a type of a workload that is tested/validated by an administrator per data protection policy; a practice recommended by a vendor (e.g., a single data protection policy should not protect more than 100 assets; for a dynamic NAS, maximum one billion files can be protected per day, etc.); one or more device state paths corresponding to a device (e.g., a client); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; a compatibility list of NICs of IHS A (200A); a list of compatible transceivers for a related NIC; etc.

In one or more embodiments, as being telemetry data, a system log (e.g., a file that records system activities across hardware and/or software components of a client, an internal lifecycle controller log (which may be generated as a result of internal testing of NIC A (212A)), etc.) may include (or specify), for example (but not limited to): a type of an asset (e.g., a type of a workload such as an SQL database, a NAS executing on-premises, a VM executing on a multi-cloud infrastructure, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A, FIG. 1); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., I/O operations executed by the microservice per second); a quantity of threads (e.g., a term indicating the quantity of operations that may be handled by a processor at once) utilized by a process that is executed by a microservice; an identifier of a client's manufacturer; media access control (MAC) information of a client; an amount of bare metal communication executed by a client (e.g., I/O operations executed by a client per second); etc.

In one or more embodiments, an alert (e.g., a predictive alert, a proactive alert, a technical alert, etc.) may be defined by a vendor (e.g., 122, FIG. 1) of a corresponding client (e.g., 110A, FIG. 1), by an administrator, by another entity, or any combination thereof. In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a vendor (e.g., 122, FIG. 1) of a corresponding client (e.g., 110A, FIG. 1), by a technical support specialist, by the administrator, by another entity, or any combination thereof. In one or more embodiments, an important keyword may be a specific technical term or a vendor specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an OS that an application is executing on; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., a priority class of an application, described below); active and inactive session counts; etc.

As used herein, "unhealthy" may refer to a compromised health state (e.g., an unhealthy state), indicating a corresponding entity (e.g., a hardware component, a client, an application, etc.) has already or is likely to, in the future, be no longer able to provide the services that the entity has previously provided. The health state determination may be made via any method based on the aggregated health information without departing from the scope of the embodiments disclosed herein.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database, any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.)) (provided by the manufacturer (e.g., 122, FIG. 1)) and/or by the administrators based on, for example, newer (e.g., updated) versions of SLAs. The unstructured and/or structured data may also be updated when, for example (but not limited to): newer system logs are received, a state of IHS A (200A) is changed, etc.

While the database has been illustrated and described as including a limited number and type of data, the database may store additional, less, and/or different data without departing from the scope of the embodiments disclosed herein. One of ordinary skill will appreciate that the database may perform other functionalities without departing from the scope of the embodiments disclosed herein.

In one or more embodiments, an application of applications (215) may be software (or a software program) executing on the host system (202) that includes instructions (e.g., data, implementation details, code, etc.) which, when executed by the processor (208), initiate the performance of one or more operations/services, for example, to be delivered to a user of a corresponding client (e.g., 110A, FIG. 1). An application of applications (215) may provide less, the same, or more functionalities and/or services comparing applications executing on a client (e.g., 110N, FIG. 1). One of ordinary skill will appreciate that the application may perform other functionalities without departing from the scope of the embodiments disclosed herein.

In one or more embodiments, IHS A (200A) may include one or more additional hardware components, not shown for clarity. For example, IHS A (200A) may include additional storage devices (that may have or provide functionalities and/or characteristics of the storage or memory resources described above in reference to FIG. 1) for storing machine-executable code (e.g., software, data, etc.), a platform controller hub (PCH) (e.g., to control certain data paths (e.g., system buses, data flow, etc.) between at least the processor (208) and peripheral devices), one or more communications ports for communicating with external devices as well as various input/output devices, one or more power supply units (PSUs) (e.g., to power hardware components of IHS A (200A)), different types of sensors (e.g., temperature sensors, voltage sensors, etc.) (that report to the BMC (220) about parameters such as temperature, cooling fan speeds, a power status, an OS status, etc.), additional CPUs and bus controllers, a display device, one or more environmental control components (e.g., cooling fans), one or more fan controllers within the BMC (220), an additional processor (e.g., a coprocessor) within the BMC (220), a BMC update module, and a component firmware update module (located, for example, within the processor (208)).

In one or more embodiments, the BMC (220) may monitor one or more sensors and send alerts to an administrator of IHS A (200A) if any of the parameters do not stay within predetermined limits, indicating a potential failure of IHS A (200A). The administrator may also remotely communicate with the BMC (220) to take particular corrective actions, such as resetting or power cycling IHS A (200A).

As yet another example, IHS A (200A) may include an orchestrator (not shown). As being a control plane, the orchestrator may include functionality to, e.g.: (i) receive a request from a user via a client (e.g., an intention specifying request to execute a certain application or functionality on IHS A (200A), an IHS composition request (described below), etc.); (ii) analyze an intention specified in a request received from a user, for example, to compose an IHS; (iii) obtain/receive one or more firmware stacks (e.g., BMC firmware stacks) and/or applications from a manufacturer and/or a database; (iv) manage distribution or allocation of available computing resources (e.g., user subscriptions to available resources) on an IHS (e.g., 120A, 120N, etc., FIG. 1); (v) obtain and track (periodically) resource utilization levels (or key performance metrics with respect to, for example, network latency, the number of open ports, OS vulnerability patching, network port open/close integrity, multitenancy related isolation, password policy, system vulnerability, data protection/encryption, data privacy/confidentiality, data integrity, data availability, be able to identify and protect against anticipated and/or non-anticipated security threats/breaches, etc.) of each component of IHS A (200A) (by obtaining telemetry data and/or logs) to identify (a) which component is healthy (e.g., generating a response to a request) and (b) which component is not healthy (e.g., not generating a response to a request, slowing down in terms of performance, etc.); (vi) based on (v), manage health of each component by implementing a policy; (vii) provide identified health of each component to other entities (e.g., administrators); (viii) automatically react and generate alerts (e.g., a predictive alert, a proactive alert, a technical alert, etc.) if one of the predetermined maximum resource utilization value thresholds is exceeded (by a component); (ix) manage computing resources of IHSs in the system (e.g., 100, FIG. 1) to provide computer-implemented services, for example, to a user; (x) in conjunction with the processor (208), instantiate composed IHSs (or provide IHS composition services); and/or (xi) store (temporarily or permanently) the aforementioned data and/or the output(s) of the above-discussed processes in the database.

In one or more embodiments, a composition request may indicate a desired outcome such as, for example, execution of one or more application on a composed IHS, receiving one or more services from those applications, etc. The orchestrator may translate the composition request into corresponding quantities of computing resources necessary to be allocated (e.g., to a corresponding composed IHS) to satisfy the intent of the composition request.

In one or more embodiments, a composition request (received from a user) may only specify an intent (e.g., an intent based request). For example, rather than specifying specific hardware resources/devices (or portions thereof) to be allocated to a particular compute resource set to obtain a composed IHS, the composition request may only specify that the composed IHS (i) needs to have predetermined characteristics and/or (ii) needs to perform certain workloads and/or provide certain functionalities. In such a scenario, the orchestrator may decide how to instantiate the composed IHS (e.g., which resources to allocate, how to allocate the resources (e.g., virtualization, emulation, redundant workload performance, data integrity models to employ, etc.), etc.).

Further, to determine the resources to allocate to the composed IHS, the orchestrator may employ the intent based model that translates the intent expressed in the composition request to one or more allocations of computing resources. For example, the orchestrator may utilize an outcome based computing resource requirements lookup table to satisfy that intent. The outcome based computing resource requirements lookup table may specify the type, make, quantity, method of management, and/or other information regarding any number of computing resources that when aggregated will be able to satisfy a given intent. The orchestrator may identify resources for allocation to satisfy composition requests via other methods without departing from the scope of the embodiments disclosed herein.

On the other hand, composition requests may specify computing resource allocations using an explicit model. For example, a composition request (received from a user) may specify (i) the resources to be allocated, (ii) the manner of presentation of those resources (e.g., emulating a particular type of device using a virtualized resource vs. path through directly to a hardware component), and/or (iii) the compute resource set(s) to which each of the allocated resources are to be presented.

As discussed above in reference to FIG. 1, computing resources of an IHS (e.g., 120A, 120N, etc.) may be divided into three logical resource sets (e.g., a compute resource set, a control resource set, and a hardware resource set). By logically dividing the computing resources of an IHS into these resource sets, different quantities and types of computing resources may be allocated (by the orchestrator) to each composed IHS thereby enabling the resources allocated to the respective IHS to match performed workloads. Further, dividing the computing resources in accordance with the three set model may enable different resource sets to be differentiated (e.g., given different personalities) to provide different functionalities. Consequently, IHSs may be composed on the basis of desired functionalities rather than just on the basis of aggregate resources to be included in the composed IHSs.

In one or more embodiments, the control resource set may include the processor (208). The processor (208) may coordinate with the orchestrator to enable composed IHSs to be instantiated. For example, the processor (208) may provide telemetry data regarding the computing resources of an IHS (e.g., 120A, 120N, etc., FIG. 1), may perform actions on behalf of the orchestrator to aggregate computing resources together, may organize the performance of duplicative workloads to improve the likelihood that workloads are completed, and/or may provide services that unify the operation of composed IHSs.

In one or more embodiments, the orchestrator may provide recomposition services. Recomposition services may include (i) monitoring the health of computing resources of composed IHSs, (ii) determining, based on the health of the computing resources, whether the computing resources are compromised, and/or (iii) initiating recomposition of computing resources that are compromised. By doing so, the orchestrator may improve the likelihood that computer-implemented services provided by the composed IHSs meet user/tenant expectations. When providing the recomposition services, the orchestrator may maintain a health status repository that includes information reflecting the health of both allocated and unallocated computing resources. For example, the orchestrator may update the health status repository when it receives information regarding the health of various computing resources.

One of ordinary skill will appreciate that the orchestrator may perform other functionalities without departing from the scope of the embodiments disclosed herein. The orchestrator may be implemented using hardware, software, or any combination thereof.

In one or more embodiments, the storage/memory resource (204), the processor (208), the BIOS (210), NIC A (212A), the applications (215), the orchestrator, and the BMC (220) may be utilized in isolation and/or in combination to provide the above-discussed functionalities. These functionalities may be invoked using any communication model including, for example, message passing, state sharing, memory sharing, etc.

Further, some of the above-discussed functionalities may be performed using available resources or when resources of IHS A (200A) are not otherwise being consumed. By performing these functionalities when resources are available, these functionalities may not be burdensome on the resources of IHS A (200A) and may not interfere with more primary workloads performed by IHS A (200A).

Turning now to FIG. 2.2, FIG. 2.2 shows an example combination of transceiver compatibilities in accordance with one or more embodiments disclosed herein. The example combination, illustrated in FIG. 2.2 and described below, is explanatory purposes only and not intended to limit the scope disclosed herein.

Referring to FIG. 2.2, assume here that the system (e.g., 100, FIG. 1) includes, at least, a switch (230) (e.g., a network switch, a top-of-rack switch, etc.), IHS A (200A), IHS B (200B), IHS C (200C), and IHS D (200D), in which (a) the switch (230) includes, at least, four transceivers (1-4) and a BMC (not shown), (b) IHS A (200A) includes, at least, NIC A (212A) (discussed above in reference to FIG. 2.1), (c) IHS B (200B) includes, at least, NIC B (212B), (d) IHS C (200C) includes, at least, NIC C (212C), and (e) IHS D (200D) includes, at least, NIC D (212D). Referring to FIG. 2.1, each NIC (e.g., 212A-D) may include/host one or more transceivers (or NIC port transceivers).

In one or more embodiments, each IHS' BMC may perform (in conjunction with the switch's BMC) the method discussed below in reference to FIG. 3.1-3.4 to determine the compatibility (or the compatibility status) of transceivers used in a related IHS and in the switch (230) (e.g., a compatibility of a transceiver with a related NIC's part number, a compatibility of a transceiver with a related switch port's part number, etc.). Referring to FIG. 2.2 and as a first combination possibility, IHS A's BMC (e.g., 220, FIG. 2.1) may determine that a first transceiver of NIC A (212A) and a first transceiver (indicated by "1") of the switch (230) are compatible/supported so that the first transceiver of NIC A (212A) may communicate with the first transceiver of the switch (230) to enable data transmission between IHS A (200A) and the switch (230) using a wide variety of communications interface standards.

Referring to FIG. 2.2 and as a second combination possibility, IHS B's BMC (not shown) may determine that a first transceiver of NIC B (212B) is non-compatible/unsupported (illustrated by a half dashed line) and a second transceiver (indicated by "2") of the switch (230) is compatible/supported, in which the first transceiver of NIC B (212B) may not communicate with the second transceiver of the switch (230) to enable data transmission between IHS B (200B) and the switch (230) using a wide variety of communications interface standards.

Referring to FIG. 2.2 and as a third combination possibility, IHS C's BMC (not shown) may determine that a first transceiver of NIC C (212C) is compatible/supported and a third transceiver (indicated by "3") of the switch (230) is non-compatible/unsupported (illustrated by a half dashed line), in which the first transceiver of NIC C (212C) may not communicate with the third transceiver of the switch (230) to enable data transmission between IHS C (200C) and the switch (230) using a wide variety of communications interface standards.

Referring to FIG. 2.2 and as a fourth combination possibility, IHS D's BMC (not shown) may determine that a first transceiver of NIC D (212D) and a fourth transceiver (indicated by "4") of the switch (230) are non-compatible/unsupported (illustrated by a half dashed line), in which the first transceiver of NIC D (212D) may not communicate with the fourth transceiver of the switch (230) to enable data transmission between IHS D (200D) and the switch (230) using a wide variety of communications interface standards.

Turning now to FIG. 2.3, FIG. 2.3 shows an example mapping between a NIC's unique identifiers (e.g., part numbers) to unique identifiers of inserted transceivers (to the NIC) in accordance with one or more embodiments disclosed herein. The example mapping, illustrated in FIG. 2.3 and described below, is explanatory purposes only and not intended to limit the scope disclosed herein.

Referring to FIG. 2.3, assume here that the example mapping (generated by a related IHS' BMC using any suitable data structure (e.g., a table, a spreadsheet, etc.)) specifies: {"NIC_PNs-to-transceiver_PNs": {{"ABC"{"Network Device Name": "AB Ethernet Converged Network Adapter X888", "Network Device Slot": 1, "Transceivers": ("Port 1": {"Transceiver Name": "DAC-RRR", "PN": "TCPM2",} "Port 2": {"Transceiver Name": "DAC-TTT", "PN": "27GG5",} "Port 3": {"Transceiver Name": "YY-55", "PN": "JNPF8",} "Port 4": {"Transceiver Name": "YY-55","PN": "JNPF8",}}}, "XYZ" {"Network Device Name": "YU Dual Port PCIE Adapter", "Network Device Slot": 2, "Transceivers": {"Port 1": {"Transceiver Name": "10H AOC", "PN": "W5G04",} "Port 2": {"Transceiver Name": "25H DAC", "PN": "58KM3",}}}}}, in which (i) (a) "ABC" is a unique identifier of "AB Ethernet Converged Network Adapter X888" NIC/network adapter (e.g., procured from a first vendor), (b) "Network Device Slot: 1" indicates the location of the NIC in a related IHS, (c) the NIC has four ports (e.g., Ports 1-4) and each port is installed with (or inserted with) a transceiver with its transceiver name and part number (e.g., a transceiver's name that is inserted to Port 1: "DAC-RRR", the transceiver's part number: "TCPM2", etc.) and (ii) (a) "XYZ" is a unique identifier of "YU Dual Port PCIE Adapter" NIC/network adapter (e.g., procured from a second vendor), (b) "Network Device Slot: 2" indicates the location of the NIC in the IHS, (c) the NIC has two ports (e.g., Ports 1-2) and each port is installed with (or inserted with) a transceiver with its transceiver name and part number (e.g., a transceiver's name that is inserted to Port 1: "10H AOC", the transceiver's part number: "W5G04", etc.).

FIG. 3.1-3.4 show a method/process for managing compatibility of transceivers in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein. Further, the method discussed below may be performed by each IHS' BMC separately.

Turning now to FIG. 3.1, the method shown in FIG. 3.1 (e.g., a validation process of transceivers that are being executed on a related IHS) may be executed by, for example, the above-discussed BMC (e.g., 220, FIG. 2.1) of IHS A (e.g., 200A, FIG. 2.1). Other components of the system (100) illustrated in FIG. 1 may also execute all or part of the method shown in FIG. 3.1 without departing from the scope of the embodiments disclosed herein.

In Step 300, the BMC sends (i) a first request to a first NIC (e.g., 212A, FIG. 2.1) of IHS A to obtain a first unique identifier (e.g., a part number including one or more numbers and/or one or more characters) of the first NIC and (ii) a second request to a second NIC of IHS A to obtain a second unique identifier of the second NIC. While the BMC is illustrated as sending requests to the first NIC and second NIC to obtain their unique identifiers, embodiments disclosed herein are not limited as such. In the embodiments of the present disclosure, the BMC may send the same request to all NICs of IHS A to obtain their unique identifiers (and to perform the remaining steps of the method by considering all NICs).

In Step 302, in response to the first request and second request, the BMC receives/obtains a first response from the first NIC specifying a first field replaceable unit (FRU) data (including, for example, the first unique identifier, vendor-specific information (e.g., the vendor's identifier, the vendor's location, etc.), information with respect to manufacturing date and time of the first NIC, etc.) and a second response from the second NIC specifying a second FRU data (including, for example, the second unique identifier, vendor-specific information (e.g., the vendor's identifier, the vendor's location, etc.), information with respect to manufacturing date and time of the second NIC, etc.).

In Step 304, the BMC sends (i) a third request (e.g., a network controller sideband interface (NCSI) command) to the first NIC to obtain a third unique identifier of a first transceiver that is being executed on the first NIC and (ii) a fourth request (e.g., a second NCSI command) to the second NIC to obtain a fourth unique identifier of a second transceiver that is being executed on the second NIC.

In Step 306, in response to the third request and fourth request, the BMC receives/obtains a third response from the first NIC specifying information about the first transceiver (including, for example, the third unique identifier, vendor-specific information (e.g., the vendor's identifier, the vendor's location, etc.), information with respect to manufacturing date and time of the first transceiver, etc.) and a fourth response from the second NIC specifying information about the second transceiver (including, for example, the fourth unique identifier, vendor-specific information (e.g., the vendor's identifier, the vendor's location, etc.), information with respect to manufacturing date and time of the second transceiver, etc.).

In Step 308, the BMC maps (i) the third unique identifier to the first unique identifier and (ii) the fourth unique identifier to the second unique identifier to generate/build a mapping (e.g., a relationship table) (see FIG. 2.3). In Step 310, the BMC obtains/reads a compatibility list from its database, in which the compatibility list specifies, at least, which transceiver is compatible to which NIC (or which transceiver is supported by which NIC) and vice versa (based on, for example, a latest release provided a corresponding manufacturer (e.g., 122, FIG. 1)).

In Step 312, by employing a set of linear, non-linear, and/or ML models, the BMC compares the mapping (generated in Step 308) against the list (obtained in Step 310) to identify/validate/determine (i) compatible transceivers (that are used in each NIC of IHS A) and (ii) non-compatible transceivers (that are used in each NIC of IHS A). For example, as a result of the comparing, the BMC may identify that a first compatibility status of a first transceiver (inserted to a first NIC of IHS A) and a second compatibility status of a second transceiver (inserted to a second NIC of IHS A).

Turning now to FIG. 3.2, the method shown in FIG. 3.2 (e.g., a validation process of transceivers that are being executed on the switch (e.g., 230, FIG. 2.2)) may be executed by, for example, the above-discussed BMC of IHS A. Other components of the system (100) illustrated in FIG. 1 may also execute all or part of the method shown in FIG. 3.2 without departing from the scope of the embodiments disclosed herein.

In Step 314, by employing a set of linear, non-linear, and/or ML models, the BMC initializes a secure communication channel to communicate with a BMC of the switch. In Step 316, upon channel initialization and in order to validate the transceivers used in the switch (or in the connected switch ports), the BMC retrieves credentials (or a set of credentials) (e.g., encrypted or hashed usernames, passwords, etc.) of the switch from the database. In one or more embodiments, the credentials may be stored to the database by a corresponding user/administrator.

In Step 318, the BMC establishes a connection (over the secure communication channel (e.g., a secure tunnel)) with the switch using the credentials and any suitable protocol (e.g., the advanced message queuing protocol (AMQP), the message queuing telemetry transport (MQTT) protocol, the TCP/IP, the hypertext transfer protocol secure (HTTPS) protocol, the generic routing encapsulation (GRE) tunneling protocol, the IP-in-IP tunneling protocol, the secure shell (SH) tunneling protocol, the point-to-point tunneling protocol, the virtual extensible LAN (VXLAN) protocol, etc.). In one or more embodiments, the secure tunnel may be, for example (but not limited to): a secure data transfer path; a secure/encrypted, point-to-point tunnel; a virtual private network (VPN) connection (or a trust relationship); a secure socket layer VPN (SSL VPN) connection; an IP security (IPSec) based VPN connection; a transport layer security VPN (TLS VPN) connection; etc.

As used herein, in networking, “tunneling” is a way for transporting data across a network using protocols (standardized set of rules for (i) formatting and processing data, and (ii) enabling computing devices to communicate with one another) that are not supported by that network. In general, a “secure tunnel” refers to a group of microservices that includes, for example (but not limited to): a user interface server service, an application programming interface (API) server service, a controller service, a tunnel connection service, an application mapping service, etc. Tunneling works by encapsulating packets (where packets are small pieces of data that may be re-assembled at their destination into a larger file), in which an “encapsulated packet” is essentially a packet inside another packet. In an encapsulated packet, the header and payload of the first packet goes inside the payload section of the surrounding packet where the original packet itself becomes the payload.

In one or more embodiments, encapsulation may be useful for encrypted network connections (“encryption” refers to the process of scrambling data in such a way that the data may only be unscrambled using a secret encryption key, where the process of undoing the encryption is called “decryption”). If a packet is completely encrypted (including the header), then network routers will not be able to transport the packet to its destination because they do not have the key and cannot see its header. By wrapping the encrypted packet inside another unencrypted packet, the packet may travel across networks like normal.

In Step 320, once connected to the switch (more specifically, to the switch's BMC) over the secure communication channel (e.g., once the secure tunnel has been established and ready to use), the BMC sends a fifth request (e.g., an HTTPS representational state transfer (REST) API request) to the switch's BMC (using the secure communication channel) to inquiry the compatibility of a related transceiver of the switch, in which the fifth request includes a set of parameters (specifying, for example, switch interface information such as a port identifier of the transceiver/switch (e.g., ethernet1/1/61:4)). In one or more embodiments, the BMC may identify the "connected" transceiver/switch port's identifier through the link layer discovery protocol (LLDP).

On the switch side, the switch's BMC may load/retrieve its latest compatibility list from its database (to its memory) at, for example, boot time in order to eliminate the need to pull the list each time a newer request is received from the BMC. The switch's BMC may parse the fifth request, extract the switch interface information, and query the loaded list to validate the compatibility of the transceiver at the specified switch interface/port.

In Step 322, in response to the fifth request, the BMC receives (over the secure communication channel) a fifth response (e.g., in a JavaScript Object Notation (JSON) format) from the switch's BMC specifying, at least, a unique identifier of a related switch transceiver (or a switch port transceiver) and compatibility (or a compatibility status) of the switch port transceiver. The fifth response may also specify, for example (but not limited to): an identifier of a related switch port (e.g., ethernet1/1/61:4), a compatibility status of the switch port transceiver (e.g., compatible/supported), a model name of the transceiver (e.g., SFP-9G-YY), one or more notes for a related user (e.g., the transceiver is fully compatible with the current switch port configuration), etc.

In Step 324, the BMC initiates, via/using a GUI (e.g., of itself), displaying of a support/compatibility status of each transceiver (hosted by the switch and IHS A) to a user/administrator using different color tones for easy identification (e.g., red color tones may be used to indicate non-compatible transceivers, green color tones may be used to indicate compatible transceivers, etc.). In one or more embodiments, using the GUI, the BMC may also display corresponding messages for each status (e.g., "supported transceiver" for compatible transceivers and "unsupported transceiver is detected; click here to view a list of supported transceivers" for non-compatible transceivers). For example, the BMC may initiate displaying of the first compatibility status of the first transceiver, the second compatibility status of the second transceiver, and a third compatibility status of a third transceiver (inserted to the switch port transceiver) to the user using the GUI.

In Step 326, the BMC makes a first determination (in real-time or near real-time) as to whether any user inquiry is received from the user with respect to a compatibility status of a transceiver (e.g., of IHS A or the switch). Accordingly, in one or more embodiments, if the result of the first determination is NO, the method may end. If the result of the first determination is YES (indicating that there are non-compatible transceivers used in the switch, in IHS A, or in both and the user/customer asked, e.g., "what are the supported part numbers of transceivers that I can use in the switch and/or in IHS A"), the method alternatively proceeds to Step 328 of FIG. 3.3.

Turning now to FIG. 3.3, the method shown in FIG. 3.3 may be executed by, for example, the above-discussed BMC of IHS A. Other components of the system (100) illustrated in FIG. 1 may also execute all or part of the method shown in FIG. 3.3 without departing from the scope of the embodiments disclosed herein.

In Step 328, as a result of the first determination in Step 326 of FIG. 3.2 being YES and based on the compatibility statuses, the BMC makes a second determination (in real-time or near real-time) as to whether one or more transceivers at both sides/systems (e.g., the switch port transceiver of the switch and one or more transceivers of a NIC(s) of IHS A) are non-compatible simultaneously. Accordingly, in one or more embodiments, if the result of the second determination is NO, the method proceeds to Step 329. If the result of the second determination is YES, the method alternatively proceeds to Step 338 of FIG. 3.4.

In Step 329, as a result of the second determination in Step 328 being NO, the BMC makes a third determination (in real-time or near real-time) as to whether only one or more transceivers (e.g., the third transceiver) of the switch are non-compatible. Accordingly, in one or more embodiments, if the result of the third determination is NO, the method proceeds to Step 334. If the result of the third determination is YES, the method alternatively proceeds to Step 330.

In Step 330, as a result of the third determination in Step 329 being YES, the BMC sends a sixth request (e.g., a "get" HTTPs request) to the switch's BMC (over the secure communication channel), in which the sixth request includes a second set of parameters (e.g., the identifier of the related switch port (e.g., ethernet1/1/61:4), a model of the port, etc.). In Step 332, in response to the sixth request, the BMC receives (over the secure communication channel) a sixth response (e.g., in a JSON format) from the switch's BMC specifying, at least, a list of compatible transceivers (including, at least, each transceiver's unique identifier (or part number) and model name, and one or more notes for the user) for the switch.

In Step 333, the BMC initiates, via/using a GUI (e.g., of itself), displaying (e.g., concurrently on a separate window) of the list of compatible transceivers (obtained in Step 332) for the switch to the user, as a recommendation (for the user) to replace the non-compatible transceivers used in the switch with compatible transceivers. In one or more embodiments, the method may end following Step 333.

In Step 334, as a result of the third determination in Step 329 being NO, the BMC makes a fourth determination (in real-time or near real-time) as to whether only one or more transceivers (e.g., the second transceiver, the first transceiver, etc.) of the NIC (of IHS A) are non-compatible. Accordingly, in one or more embodiments, if the result of the fourth determination is NO, the method may end. If the result of the fourth determination is YES, the method alternatively proceeds to Step 336.

In Step 336, as a result of the fourth determination in Step 334 being YES, the BMC queries its database to identify a list of compatible transceivers (including, at least, each transceiver's unique identifier (or part number) and model name, and one or more notes for the user) for the corresponding NIC (e.g., a list of transceivers that are compatible with the NIC's part number (or unique identifier)). In Step 337, the BMC initiates, via/using a GUI (e.g., of itself), displaying (e.g., concurrently on a separate window) of the list of compatible transceivers (identified in Step 336) for the NIC to the user, as a recommendation (for the user) to replace the non-compatible transceivers used in the NIC with compatible transceivers. In one or more embodiments, the method may end following Step 337.

Turning now to FIG. 3.4, the method shown in FIG. 3.4 may be executed by, for example, the above-discussed BMC of IHS A. Other components of the system (100) illustrated in FIG. 1 may also execute all or part of the method shown in FIG. 3.4 without departing from the scope of the embodiments disclosed herein.

In Step 338, as a result of the second determination in Step 328 of FIG. 3.3 being YES (indicating that the related transceivers are non-compatible simultaneously), the BMC sends a sixth request (e.g., a "get" HTTPs request) to the switch's BMC (over the secure communication channel), in which the sixth request includes a second set of parameters (e.g., the identifier of the related switch port (e.g., ethernet1/1/61:4), a model of the port, etc.). In Step 340, in response to the sixth request, the BMC receives (over the secure communication channel) a sixth response (e.g., in a JSON format) from the switch's BMC specifying, at least, a "first" list of compatible transceivers (including, at least, each transceiver's unique identifier (or part number) and model name, and one or more notes for the user) for the switch.

In Step 342, the BMC queries its database/storage to identify a second list of compatible transceivers (including, at least, each transceiver's unique identifier (or part number) and model name, and one or more notes for the user) for the corresponding NIC(s) (e.g., a second list of transceivers that are compatible with the NIC's part number (or unique identifier)).

In Step 344, the BMC initiates, via/using a GUI (e.g., of itself), displaying (e.g., concurrently on a separate window) of a combination of the list (obtained in Step 340) and the second list (obtained in Step 342) (e.g., as a comprehensive list) of compatible transceivers for the switch and for the NIC(s) to the user, as a recommendation (for the user) to replace the non-compatible transceivers used in the NIC and in the switch with compatible transceivers. In one or more embodiments, the method may end following Step 344.

In one or more embodiments, the framework discussed above in reference to FIGS. 1-3.4 may be delivered to users (e.g., end-users, customers, etc.) via two workflows: (i) a factory/manufacturer workflow and (ii) an "after point of sales (APOS)" workflow. The manufacturer workflow may be based on four parts: (a) vendors, (b) the BMC team, (c) the manufacturer, and (d) the users. In this workflow, the vendors may first validate transceivers and related cables in development projects. When a related development project is completed and validated (e.g., no component and/or code related to the project cannot be changed/replaced anymore), the vendor may provide the support list of validated transceivers and cables to the BMC team. Thereafter, the BMC team may compile the support list into the next firmware release and push the firmware release to the manufacturer (e.g., 122, FIG. 1). The manufacturer may then deploy the firmware release to shipping computing devices (e.g., ordered by the users).

The APOS workflow may be based on four parts: (a) vendors, (b) the BMC team, (c) the customer support team, and (d) the users. In this workflow, the vendors may first validate transceivers and related cables in development projects. When a related development project is completed and validated (e.g., no component and/or code related to the project cannot be changed/replaced anymore), the vendor may provide the support list of validated transceivers and cables to the BMC team. Thereafter, the BMC team may compile the support list into the next firmware release and push the firmware release to the customer support team. The customer support team may then share/publish the firmware release to a related organization's KB website so that users can download the release (e.g., as an application upgrade/patch/fix) from the website for their previously purchased (and delivered) computing devices.

Turning now to FIG. 4, FIG. 4 shows a diagram of a computing device in accordance with one or more embodiments disclosed herein.

In one or more embodiments disclosed herein, the computing device (400) may include one or more computer processors (402), non-persistent storage (404) (e.g., volatile memory, such as RAM, cache memory), persistent storage (406) (e.g., a non-transitory computer readable medium, a hard disk, an optical drive such as a CD drive or a DVD drive, a Flash memory, etc.), a communication interface (412) (e.g., Bluetooth interface, infrared interface, network interface, optical interface, etc.), an input device(s) (410), an output device(s) (408), and numerous other elements (not shown) and functionalities. Each of these components is described below.

In one or more embodiments, the computer processor(s) (402) may be an integrated circuit for processing instructions. For example, the computer processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., a LAN, a WAN, Internet, mobile network, etc.) and/or to another device, such as another computing device.

In one or more embodiments, the computing device (400) may include one or more output devices (408), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing compatibility of transceivers, the method comprising:

sending a first request to a first network interface card (NIC) of an information handling system (IHS) to obtain a first unique identifier (UI) of the first NIC and a second request to a second NIC of the IHS to obtain a second UI of the second NIC;

receiving, in response to the first request and the second request, a first response from the first NIC comprising the first UI and a second response from the second NIC comprising the second UI;

sending a third request to the first NIC to obtain a third UI of a first transceiver that is being executed on the first NIC and a fourth request to the second NIC to obtain a fourth UI of a second transceiver that is being executed on the second NIC;

receiving, in response to the third request and the fourth request, a third response from the first NIC comprising the third UI and a fourth response from the second NIC comprising the fourth UI;

mapping the third UI to the first UI and the fourth UI to the second UI to generate a mapping;

using the mapping and a capability list to identify a first compatibility status of the first transceiver and a second compatibility status of the second transceiver;

establishing, after the obtaining, a connection with a switch over a secure communication channel using a set of credentials;

sending, using the connection, a fifth request to a baseboard management controller (BMC) of the switch, wherein the fifth request comprises a set of parameters;

receiving, in response to the fifth request, a fifth response from the BMC comprising a fifth UI of a third transceiver that is being executed on the switch and a third compatibility status of the third transceiver; and initiating displaying of the first compatibility status, the second compatibility status, and the third compatibility status to a user of the IHS using a graphical user interface (GUI).

2. The method of claim 1, further comprising:

initializing the secure communication channel to communicate with the BMC; and upon initialization of the channel, retrieving the set of credentials.

3. The method of claim 1, further comprising:

after displaying of the first compatibility status, the second compatibility status, and the third compatibility status:

making a first determination that an inquiry with respect to a fourth compatibility status of each transceiver is received from the user;

making, based on the first determination, the first compatibility status, the second compatibility status, and the third compatibility status, a second determination that not the first transceiver, the second transceiver, and the third transceiver are non-compatible simultaneously;

making, based on the second determination, a third determination that only the third transceiver is non-compatible;

sending, based on the third determination, a sixth request to the BMC;

receiving, in response to the sixth request, a sixth response from the BMC comprising a list of compatible transceivers for the switch; and initiating displaying of the list of compatible transceivers for the switch to the user using the GUI.

4. The method of claim 1, further comprising:

after displaying of the first compatibility status, the second compatibility status, and the third compatibility status:

making a first determination that an inquiry with respect to a fourth compatibility status of each transceiver is received from the user;

making, based on the first determination, the first compatibility status, the second compatibility status, and the third compatibility status, a second determination that not the first transceiver, the second transceiver, and the third transceiver are non-compatible simultaneously;

making, based on the second determination, a third determination that the third transceiver is compatible;

making, based on the third determination, a fourth determination that the second transceiver is non-compatible;

querying, based on the fourth determination, a storage to identify a list of compatible transceivers for the second NIC; and initiating displaying of the list of compatible transceivers for the second NIC to the user using the GUI.

5. The method of claim 1, further comprising:

after displaying of the first compatibility status, the second compatibility status, and the third compatibility status:

making a first determination that an inquiry with respect to a fourth compatibility status of each transceiver is received from the user;

making, based on the first determination, the first compatibility status, the second compatibility status, and the third compatibility status, a second determination that the first transceiver, the second transceiver, and the third transceiver are non-compatible simultaneously;

based on the second determination:

sending a sixth request to the BMC;

receiving, in response to the sixth request, a sixth response from the switch's BMC comprising a first list of compatible transceivers for the switch;

querying a storage to identify a second list of compatible transceivers for the second NIC and the first NIC;

initiating displaying of a combination of the first list and the second list for the first NIC, the second NIC, and the switch to the user using the GUI.

6. The method of claim 1, wherein the switch is a top-of-rack switch.

7. The method of claim 1, wherein the secure communication channel is established using a hypertext transfer protocol secure (HTTPS) protocol.

8. A non-transitory computer readable medium comprising computer readable program code, which when executed by a computer processor enables the computer processor to perform a method for managing compatibility of transceivers, the method comprising:

sending a first request to a first network interface card (NIC) of an information handling system (IHS) to obtain a first unique identifier (UI) of the first NIC and a second request to a second NIC of the IHS to obtain a second UI of the second NIC;

receiving, in response to the first request and the second request, a first response from the first NIC comprising the first UI and a second response from the second NIC comprising the second UI;

sending a third request to the first NIC to obtain a third UI of a first transceiver that is being executed on the first NIC and a fourth request to the second NIC to obtain a fourth UI of a second transceiver that is being executed on the second NIC;

receiving, in response to the third request and the fourth request, a third response from the first NIC comprising the third UI and a fourth response from the second NIC comprising the fourth UI;

mapping the third UI to the first UI and the fourth UI to the second UI to generate a mapping;

using the mapping and a capability list to identify a first compatibility status of the first transceiver and a second compatibility status of the second transceiver;

establishing, after the obtaining, a connection with a switch over a secure communication channel using a set of credentials;

sending, using the connection, a fifth request to a baseboard management controller (BMC) of the switch, wherein the fifth request comprises a set of parameters;

receiving, in response to the fifth request, a fifth response from the BMC comprising a fifth UI of a third transceiver that is being executed on the switch and a third compatibility status of the third transceiver; and initiating displaying of the first compatibility status, the second compatibility status, and the third compatibility status to a user of the IHS using a graphical user interface (GUI).

9. The non-transitory computer readable medium of claim 8, further comprising:

initializing the secure communication channel to communicate with the BMC; and upon initialization of the channel, retrieving the set of credentials.

10. The non-transitory computer readable medium of claim 8, further comprising:

after displaying of the first compatibility status, the second compatibility status, and the third compatibility status:

making a first determination that an inquiry with respect to a fourth compatibility status of each transceiver is received from the user;

making, based on the first determination, the first compatibility status, the second compatibility status, and the third compatibility status, a second determination that not the first transceiver, the second transceiver, and the third transceiver are non-compatible simultaneously;

making, based on the second determination, a third determination that only the third transceiver is non-compatible;

sending, based on the third determination, a sixth request to the BMC;

receiving, in response to the sixth request, a sixth response from the BMC comprising a list of compatible transceivers for the switch; and initiating displaying of the list of compatible transceivers for the switch to the user using the GUI.

11. The non-transitory computer readable medium of claim 8, further comprising:

after displaying of the first compatibility status, the second compatibility status, and the third compatibility status:

making a first determination that an inquiry with respect to a fourth compatibility status of each transceiver is received from the user;

making, based on the first determination, the first compatibility status, the second compatibility status, and the third compatibility status, a second determination that not the first transceiver, the second transceiver, and the third transceiver are non-compatible simultaneously;

making, based on the second determination, a third determination that the third transceiver is compatible;

making, based on the third determination, a fourth determination that the second transceiver is non-compatible;

querying, based on the fourth determination, a storage to identify a list of compatible transceivers for the second NIC; and initiating displaying of the list of compatible transceivers for the second NIC to the user using the GUI.

12. The non-transitory computer readable medium of claim 8, further comprising:

after displaying of the first compatibility status, the second compatibility status, and the third compatibility status:

making a first determination that an inquiry with respect to a fourth compatibility status of each transceiver is received from the user;

making, based on the first determination, the first compatibility status, the second compatibility status, and the third compatibility status, a second determination that the first transceiver, the second transceiver, and the third transceiver are non-compatible simultaneously;

based on the second determination:

sending a sixth request to the BMC;

receiving, in response to the sixth request, a sixth response from the switch's BMC comprising a first list of compatible transceivers for the switch;

querying a storage to identify a second list of compatible transceivers for the second NIC and the first NIC;

initiating displaying of a combination of the first list and the second list for the first NIC, the second NIC, and the switch to the user using the GUI.

13. The non-transitory computer readable medium of claim 8, wherein the switch is a top-of-rack switch.

14. The non-transitory computer readable medium of claim 8, wherein the secure communication channel is established using a hypertext transfer protocol secure (HTTPS) protocol.

15. A system for managing compatibility of transceivers, the system comprising:

a processor comprising circuitry;

memory comprising instructions, which when executed perform a method, the method comprising:

sending a first request to a first network interface card (NIC) of an information handling system (IHS) to obtain a first unique identifier (UI) of the first NIC and a second request to a second NIC of the IHS to obtain a second UI of the second NIC;

receiving, in response to the first request and the second request, a first response from the first NIC comprising the first UI and a second response from the second NIC comprising the second UI;

sending a third request to the first NIC to obtain a third UI of a first transceiver that is being executed on the first NIC and a fourth request to the second NIC to obtain a fourth UI of a second transceiver that is being executed on the second NIC;

receiving, in response to the third request and the fourth request, a third response from the first NIC comprising the third UI and a fourth response from the second NIC comprising the fourth UI;

mapping the third UI to the first UI and the fourth UI to the second UI to generate a mapping;

using the mapping and a capability list to identify a first compatibility status of the first transceiver and a second compatibility status of the second transceiver;

establishing, after the obtaining, a connection with a switch over a secure communication channel using a set of credentials;

sending, using the connection, a fifth request to a baseboard management controller (BMC) of the switch, wherein the fifth request comprises a set of parameters;

receiving, in response to the fifth request, a fifth response from the BMC comprising a fifth UI of a third transceiver that is being executed on the switch and a third compatibility status of the third transceiver; and initiating displaying of the first compatibility status, the second compatibility status, and the third compatibility status to a user of the IHS using a graphical user interface (GUI).

16. The system of claim 15, further comprising:

initializing the secure communication channel to communicate with the BMC; and upon initialization of the channel, retrieving the set of credentials.

17. The system of claim 15, further comprising:

after displaying of the first compatibility status, the second compatibility status, and the third compatibility status:

making a first determination that an inquiry with respect to a fourth compatibility status of each transceiver is received from the user;

making, based on the first determination, the first compatibility status, the second compatibility status, and the third compatibility status, a second determination that not the first transceiver, the second transceiver, and the third transceiver are non-compatible simultaneously;

making, based on the second determination, a third determination that only the third transceiver is non-compatible;

sending, based on the third determination, a sixth request to the BMC;

receiving, in response to the sixth request, a sixth response from the BMC comprising a list of compatible transceivers for the switch; and initiating displaying of the list of compatible transceivers for the switch to the user using the GUI.

18. The system of claim 15, further comprising:

after displaying of the first compatibility status, the second compatibility status, and the third compatibility status:

making a first determination that an inquiry with respect to a fourth compatibility status of each transceiver is received from the user;

making, based on the first determination, the first compatibility status, the second compatibility status, and the third compatibility status, a second determination that not the first transceiver, the second transceiver, and the third transceiver are non-compatible simultaneously;

making, based on the second determination, a third determination that the third transceiver is compatible;

making, based on the third determination, a fourth determination that the second transceiver is non-compatible;

querying, based on the fourth determination, a storage to identify a list of compatible transceivers for the second NIC; and initiating displaying of the list of compatible transceivers for the second NIC to the user using the GUI.

19. The system of claim 15, further comprising:

after displaying of the first compatibility status, the second compatibility status, and the third compatibility status:

making a first determination that an inquiry with respect to a fourth compatibility status of each transceiver is received from the user;

making, based on the first determination, the first compatibility status, the second compatibility status, and the third compatibility status, a second determination that the first transceiver, the second transceiver, and the third transceiver are non-compatible simultaneously;

based on the second determination:

sending a sixth request to the BMC;

receiving, in response to the sixth request, a sixth response from the switch's BMC comprising a first list of compatible transceivers for the switch;

querying a storage to identify a second list of compatible transceivers for the second NIC and the first NIC;

initiating displaying of a combination of the first list and the second list for the first NIC, the second NIC, and the switch to the user using the GUI.

20. The system of claim 15, wherein the switch is a top-of-rack switch.

* * * * *